(12) United States Patent
Panigot

(10) Patent No.: US 10,448,741 B2
(45) Date of Patent: Oct. 22, 2019

(54) COLLAPSIBLE SUPPORT STRUCTURE

(71) Applicant: Sunny Fold, LLC, Germantown, MD (US)

(72) Inventor: Joseph E. Panigot, Germantown, MD (US)

(73) Assignee: SUNNY FOLD LLC, Germantown, MD (US)

(*) Notice: Subject to any disclaimer, the term of this patent is extended or adjusted under 35 U.S.C. 154(b) by 0 days.

(21) Appl. No.: 15/900,045

(22) Filed: Feb. 20, 2018

(65) Prior Publication Data
US 2019/0254432 A1 Aug. 22, 2019

(51) Int. Cl.
*A47C 5/10* (2006.01)
*A47C 7/00* (2006.01)
*A47C 4/28* (2006.01)
*A47C 1/14* (2006.01)
*B62B 1/12* (2006.01)
*A47C 4/42* (2006.01)

(52) U.S. Cl.
CPC .............. *A47C 5/10* (2013.01); *A47C 1/14* (2013.01); *A47C 4/286* (2013.01); *A47C 4/42* (2013.01); *A47C 7/006* (2013.01); *B62B 1/12* (2013.01); *B62B 2202/52* (2013.01)

(58) Field of Classification Search
CPC .... A47C 5/10; A47C 5/04; A47C 1/14; A47C 1/143; A47C 4/286; A47C 4/42; A47C 4/28; A47C 4/32; A47C 4/34; A47C 4/44; A47C 7/006; B62B 1/12; B62B 2202/52
USPC .......................................................... 297/31
See application file for complete search history.

(56) References Cited

U.S. PATENT DOCUMENTS

| | | | |
|---|---|---|---|
| 2,757,937 A | 8/1956 | Illsley | |
| 2,992,011 A * | 7/1961 | Becan | A01G 20/30 280/654 |
| 3,043,603 A | 7/1962 | Major, Sr. | |
| 3,083,995 A * | 4/1963 | Bradshaw | A47C 4/34 297/39 |
| 3,147,748 A | 9/1964 | Frank | |
| 3,166,339 A | 1/1965 | Earley | |
| 3,227,467 A | 1/1966 | Fugitt, Sr. | |
| 3,400,943 A | 9/1968 | Meiklejohn | |
| 3,424,474 A | 1/1969 | Karnow et al. | |
| 3,962,853 A | 6/1976 | Schwalm | |
| 4,114,916 A | 9/1978 | Oyama | |
| 4,262,928 A | 4/1981 | Leitzel | |
| 4,323,260 A | 4/1982 | Suchy | |
| 4,355,818 A | 10/1982 | Watts | |

(Continued)

OTHER PUBLICATIONS

18" Seat Height Wooden Director's Chair with Black Canvas Seat, DISPLAYS2GO, https://www.displays2go.com/P-13749/Folding-Directors-Chair-Wood-Base-Trade-Shows-Promotional-Events?utm_source=google.pla&utm_medium=cpc&utm_campaign=GooglePLA&gclid=EAlaIQobChMlhLfR5KaH4gIV0sDICh2lbwWCEAQ-YAiAB EgJBjvD_BwE, 1 page. (last accessed on May 16, 2019).

*Primary Examiner* — Mark R Wendell
(74) *Attorney, Agent, or Firm* — Edell, Shapiro & Finnan, LLC

(57) ABSTRACT

A collapsible support structure includes a plurality of platform assemblies, a handle assembly, and an axle assembly. In use, the collapsible support structure may folded from a deployed position in which it rolls along a surface to transport items, to a stowed position, in which it is collapsed in a compact geometry for storage. The collapsible support structure includes at least one support member removably coupled to one of the platform assemblies.

20 Claims, 21 Drawing Sheets

(56) References Cited

U.S. PATENT DOCUMENTS

| | | |
|---|---|---|
| 4,362,307 A | 12/1982 | Nakatani |
| 4,362,309 A | 12/1982 | Stamper |
| 4,376,547 A | 3/1983 | Dominko |
| 4,537,421 A * | 8/1985 | Teachout .................. B62B 1/12 |
| | | 211/195 |
| 4,561,674 A | 12/1985 | Alessio |
| 4,618,157 A * | 10/1986 | Resnick .................. B62B 13/18 |
| | | 280/43.1 |
| 4,645,262 A | 2/1987 | Furubotten |
| 4,671,522 A | 6/1987 | Fragione, Jr. |
| 4,733,905 A | 3/1988 | Buickerood et al. |
| 4,790,559 A | 12/1988 | Edmonds |
| 4,915,408 A | 4/1990 | Clemence et al. |
| 5,072,958 A | 12/1991 | Young |
| 5,106,112 A | 4/1992 | Sargent |
| 5,176,393 A | 1/1993 | Robertson et al. |
| 5,265,892 A | 11/1993 | Said |
| 5,312,006 A | 5/1994 | Lag |
| 5,364,112 A | 11/1994 | Jackson |
| 5,395,163 A | 3/1995 | Mandell et al. |
| 5,474,316 A | 12/1995 | Britton |
| 5,667,163 A | 9/1997 | Sordahl |
| 5,692,779 A | 12/1997 | Hedgepeth |
| 5,885,047 A | 3/1999 | Davis et al. |
| 5,887,879 A | 3/1999 | Chumley |
| 5,979,921 A | 11/1999 | Derven et al. |
| 6,042,122 A * | 3/2000 | Mohr .................. B62B 13/06 |
| | | 280/43.14 |
| 6,186,520 B1 | 2/2001 | Barten |
| 6,241,276 B1 | 6/2001 | Wilburn |
| 6,364,596 B1 | 4/2002 | Spencer et al. |
| 6,375,200 B1 | 4/2002 | Harter |
| 6,460,866 B1 | 10/2002 | Altschul et al. |
| 6,471,236 B1 | 10/2002 | Eskridge |
| 6,471,237 B1 | 10/2002 | Bedsole |
| 6,474,856 B2 | 11/2002 | Billot |
| 6,557,867 B1 | 5/2003 | Angstadt |
| 6,808,186 B1 | 10/2004 | Su |
| 6,880,835 B2 * | 4/2005 | Tornabene .............. B62B 1/002 |
| | | 182/20 |
| 6,880,851 B1 * | 4/2005 | Summers ................ B62B 1/266 |
| | | 280/43.1 |
| 6,886,836 B1 | 5/2005 | Wise |
| 6,938,905 B1 | 9/2005 | Tsai |
| 7,017,939 B2 | 3/2006 | Darling, III |
| 7,025,363 B1 | 4/2006 | Leight |
| 7,040,635 B1 | 5/2006 | Remole |
| 7,264,265 B2 | 9/2007 | Shapiro |
| 7,316,407 B1 | 1/2008 | Elden |
| 7,448,632 B1 | 11/2008 | Neito |
| 7,464,947 B2 | 12/2008 | Cortese |
| 8,608,188 B2 | 12/2013 | Goldszer |
| 8,764,046 B2 | 7/2014 | Baldemor et al. |
| 8,770,597 B1 * | 7/2014 | Phillips .................... B62B 1/12 |
| | | 280/30 |
| 9,050,988 B1 | 6/2015 | McLeod |
| 9,150,230 B2 | 10/2015 | Panigot |
| 9,260,129 B2 * | 2/2016 | Thompson .............. B62B 19/04 |
| 9,487,225 B1 * | 11/2016 | Looman .................. B62B 13/06 |
| 9,598,095 B2 | 3/2017 | Panigot |
| 2002/0096862 A1 | 7/2002 | Fang |
| 2002/0163163 A1 | 11/2002 | Shapiro |
| 2003/0034636 A1 | 2/2003 | Ng |
| 2004/0046342 A1 | 3/2004 | Lin |
| 2005/0258621 A1 | 11/2005 | Johnson et al. |
| 2006/0061053 A1 | 3/2006 | Cortese |
| 2006/0207831 A1 | 9/2006 | Moore et al. |
| 2007/0194560 A1 | 8/2007 | Zink |
| 2008/0272578 A1 | 11/2008 | Tsai |
| 2008/0314300 A1 | 12/2008 | Bowsher |
| 2009/0058047 A1 | 3/2009 | Brosh et al. |
| 2009/0102248 A1 * | 4/2009 | Grace .................... A47C 4/283 |
| | | 297/16.2 |
| 2010/0078907 A1 | 4/2010 | Voves |
| 2010/0078912 A1 | 4/2010 | Chang et al. |
| 2010/0308563 A1 | 12/2010 | Martin |
| 2011/0274526 A1 | 11/2011 | Kusick |
| 2011/0291390 A1 | 12/2011 | Benimeli |
| 2012/0038123 A1 | 2/2012 | Li |
| 2012/0153587 A1 | 6/2012 | Ryan |
| 2012/0160576 A1 | 6/2012 | Anasiewicz |
| 2012/0160577 A1 | 6/2012 | Anasiewicz |
| 2012/0211038 A1 * | 8/2012 | Pirshafiey ............ A47C 21/003 |
| | | 135/96 |
| 2012/0217727 A1 | 8/2012 | Lee |
| 2013/0049333 A1 | 2/2013 | Yang |
| 2013/0147164 A1 * | 6/2013 | Cooper .................... B62B 1/12 |
| | | 280/659 |
| 2013/0153322 A1 | 6/2013 | Constin |
| 2014/0097599 A1 | 4/2014 | Panigot |
| 2014/0246837 A1 * | 9/2014 | Delattre .................. B62B 1/14 |
| | | 280/47.19 |
| 2015/0123361 A1 * | 5/2015 | Willett .................... B62B 1/002 |
| | | 280/47.18 |
| 2016/0039441 A1 | 2/2016 | Panigot |
| 2016/0257327 A1 * | 9/2016 | Gayk, Jr. .................. B62B 1/12 |
| 2017/0166230 A1 | 6/2017 | Panigot |

* cited by examiner

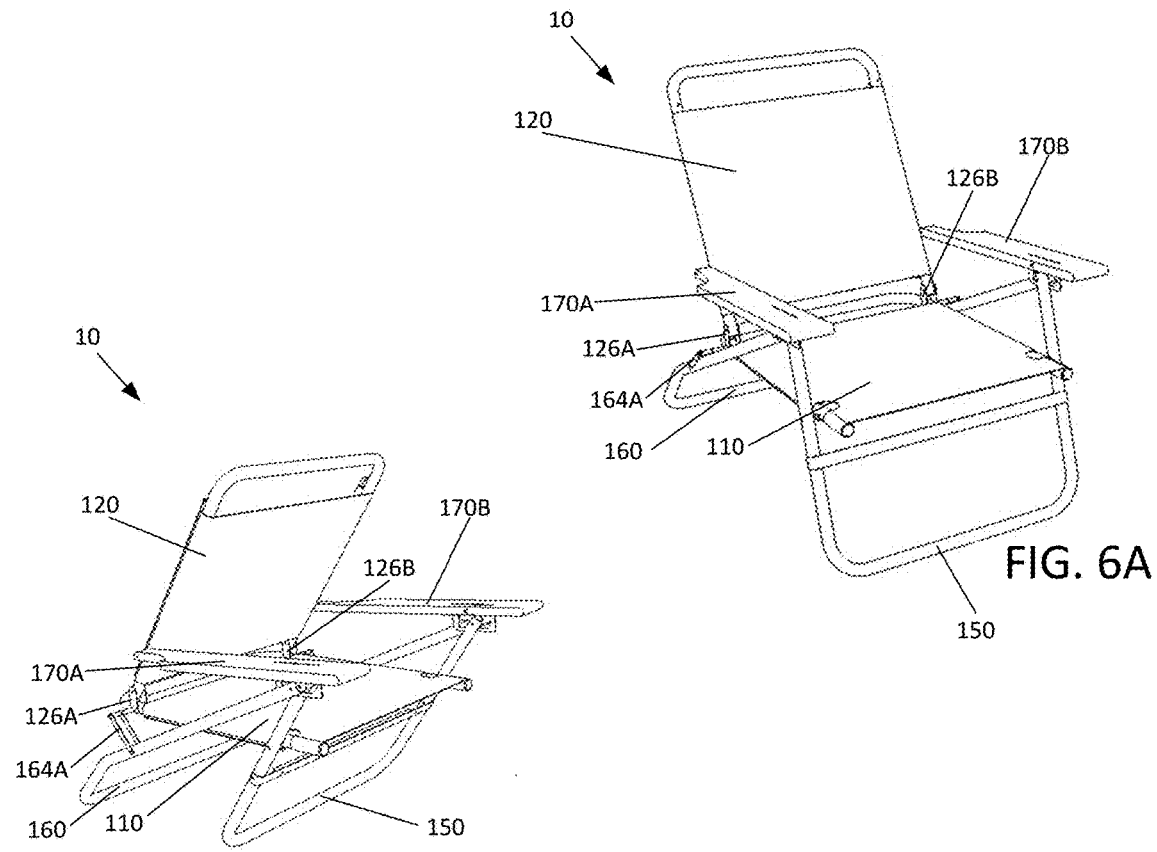
FIG. 6A
FIG. 6B
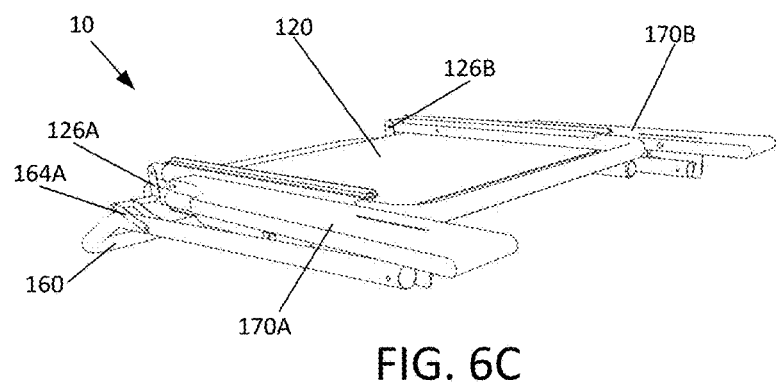
FIG. 6C

COLLAPSIBLE SUPPORT STRUCTURE

FIELD OF THE INVENTION

This invention is directed toward a collapsible utility support structure.

BACKGROUND OF THE INVENTION

Conventional collapsible support structures are able to be folded between a deployed configuration, in which the collapsible support structure is able to support an object above a support surface, and a storage configuration, in which the frame of the collapsible support structure is folded to lay substantially flat. These conventional collapsible support structures typically contain supporting members, or supporting fabrics, that are permanently attached to the frame of the conventional collapsible support structures. These supporting members typically wear and fade faster than the frame of the conventional collapsible support structures. This often renders the conventional support structures unusable well before the frames of the conventional collapsible support structures become worn or damaged. In addition, because the supporting members are permanently attached to the frame, the conventional collapsible support structures are limited to a single appearance with the supporting members because users are unable to change the appearance (i.e., change the styling of the supporting members coupled to the frame of the collapsible support structures) of the conventional collapsible support structures.

It would thus be desirable to provide a collapsible support structure that includes supporting members that are removably coupled to the frame of the collapsible support structure.

SUMMARY OF THE INVENTION

The present invention is directed toward a reconfigurable collapsible support structure including a plurality of platform assemblies, a handle assembly, an axle assembly, and a plurality of armrest assemblies. In use, the collapsible support structure may fold from a deployed position in which it is capable of being rolled along a surface to transport items, to a stowed position, in which it is collapsed in a compact geometry for storage. The collapsible support structure includes at least one support member removably coupled to one of the platform assemblies. The collapsible support structure may be further integrated or independently embodied as a chair, chaise lounge, garden cart, bicycle utility cart, and/or a bicycle passenger cart.

In one embodiment of the collapsible support structure, the collapsible support structure includes a frame member, a retaining mechanism, and a support member. The retaining mechanism is disposed on the frame member and further includes a first spacer element, a second spacer element, and an elongate bar. The first spacer element is coupled to the frame member at a first location, while the second spacer element is coupled to the frame member at a second location that is spaced from the first location. The elongate bar includes a first end and a second end, the first end being coupled to the first spacer element and the second end being coupled to the second spacer element. The elongate bar, first spacer element, second spacer element, and frame member collectively define a slot. Furthermore, the support member is removably coupleable to the frame member via the retaining mechanism. The support member includes an end, wherein the end of the support member is disposed within or adjacent to the slot of the retaining mechanism when the support member is coupled to the frame member.

In another embodiment, the collapsible support structure includes a frame, a first retaining bar, a second retaining bar, and a support member. The frame includes a first arm and a second arm, the first and second arms being laterally spaced from one another. The first retaining bar is disposed on the first arm of the frame, where the first retaining bar and the first arm collectively define a first slot. The second retaining bar is disposed on the second arm of the frame, where the second retaining bar and the second arm collectively define a second slot. The support member includes a first end and a second end, where the support arm is removably coupleable to the frame. When coupled, the first end of the support member is disposed through the first slot and the second end of the support member is disposed through the second slot. Furthermore, when coupled, the support member defines a support surface configured to support and object between the first arm and the second arm of the frame.

Yet another embodiment includes the method for attaching or removably coupling the support member to a frame of a collapsible support structure. First, a first end of the support member, which includes a loop, is inserted through the slot of a retaining mechanism mounted to an elongated arm of the frame. A retention member is inserted into the loop of the end of the support member to secure the end of the support member to the elongated arm of the frame via the retaining mechanism.

BRIEF DESCRIPTION OF THE DRAWINGS

FIGS. 6A-6C illustrate the folding process of the of the collapsible support structure.

Like reference numerals have been used to identify like elements throughout this disclosure.

DETAILED DESCRIPTION OF THE INVENTION

Presented herein is a new and improved collapsible support structure. The collapsible support structure includes a reconfigurable frame and a plurality of support members that are removably coupled to the frame. An axle assembly coupled to the frame and a reconfigurable handle may also be included. The reconfigurable frame may be reconfigured between a deployed configuration, where the collapsible support structure is configured to support items placed thereupon above a support surface, and a stowed configuration, where the frame of the collapsible support structure is folded to be substantially flat and compact, especially compared to that of the collapsible support structure in the deployed configuration. The stowed configuration enables the collapsible support structure to be easily stored in a storage location without taking up as much room as when the collapsible support structure is in the deployed configuration. The plurality of support members may be removably coupled to the frame, which enables a user to change the support members when they become worn or when a new design is desired. If included in the collapsible support structure, the axle assembly enables a set of wheels to be easily attached to the frame of the collapsible support structure to facilitate more effortless movement of the collapsible support structure, regardless of the collapsible support structure being in the deployed configuration or the stowed configuration. The axle assembly further enables wheels to be easily removed when the wheels are no longer in use or desired by the user of the collapsible support structure. Finally, the reconfigurable handle may be quickly and easily reconfigured between a deployed configuration and a stowed configuration. When in the deployed configuration, and when the wheels are attached to the axle assembly, if included in the collapsible support structure, the handle may be utilized by a user to move and direct the collapsible support structure along a support surface.

While the embodiment of the collapsible support structure illustrated in FIGS. 1A, 1B, 2A, 2B, 3A, 3B, 4A-4D, 5A-5C, 6A-6C, 7A, 7B, 8A, 8B, and 9A-9C is depicted as a foldable chair or a foldable cart with a set of wheels, the collapsible support structure may take any form that utilizes some or all of the features described herein. For example, other embodiments of the collapsible support structure include, but are not limited to, a wheel chair, a garden cart, a utility cart, a bicycle trailer, a pet trailer, a stroller, a wheelbarrow, a beach chair, a chaise lounge, a wagon, etc.

Figure 1A:
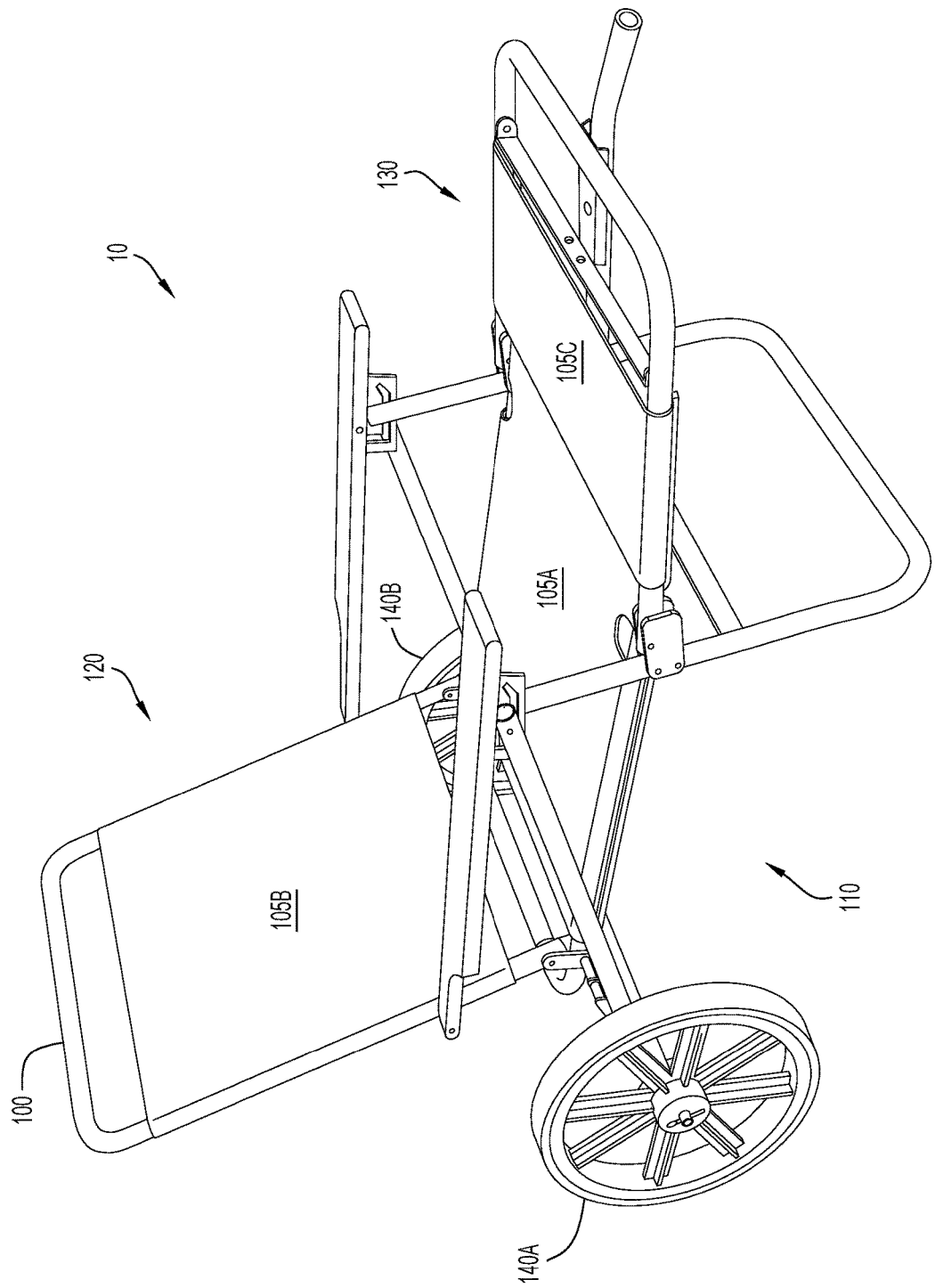
FIG. 1A illustrates a perspective view of a collapsible support structure in accordance with an embodiment of the invention, the collapsible support structure shown in its deployed configuration.

Referring to FIG. 1A, in an embodiment, the collapsible support structure 10 includes a frame 100 defining a seat or first platform assembly 110, a seatback or second platform assembly 120, and a forward or third platform assembly 130. The seatback assembly 120 is coupled proximate to the rearward portion of the seat assembly 110, while the forward platform assembly 130 is coupled to the forward portion of the seat assembly 110. The collapsible support structure 10 further includes first 140A and second 140B wheel assemblies. The frame 100 may be formed of any material suitable for its described purpose. By way of example, the frame may be formed of generally cylindrical hollow bars formed from metal. In other embodiments, the frame may be formed by bars having any shape and being formed from any other material.

The collapsible support structure 10 may further include supporting members 105A, 105B, 105C disposed on selected locations along the frame 100. In the embodiment illustrated, the first supporting member 105A is coupled to the seat assembly 110, the second supporting member 105B is coupled to the seatback assembly 120, and the third supporting member 105C is coupled to the forward assembly 130. The supporting members 105A, 105B, 105C may each define a generally planar member having a top surface and a bottom surface. When coupled to the frame 100 of the collapsible support structure 10, the supporting members 105A, 105B, 105C each provide a support surface on which to place and support items or people. In the illustrated embodiment, the supporting members 105A, 105B, 105C define a seating or support surfaces operable to support a user seated therein or to support goods during transport. The material forming the supporting members 105A, 105B, 105C may include soft goods material such as, but not limited to, cloth, canvas, mesh, etc. As another example of soft goods material, a plurality of flexible plastic strips similar to those utilized in patio and pool furniture can be utilized to form a resting or carrying surface. Thus, the supporting members 105A, 105B, 105C are constructed from a material that is substantially flexible and deformable. One of more of supporting members 105A, 105B, 105C may also be embodied as a continuous piece of material or single unit.

Figure 1B:
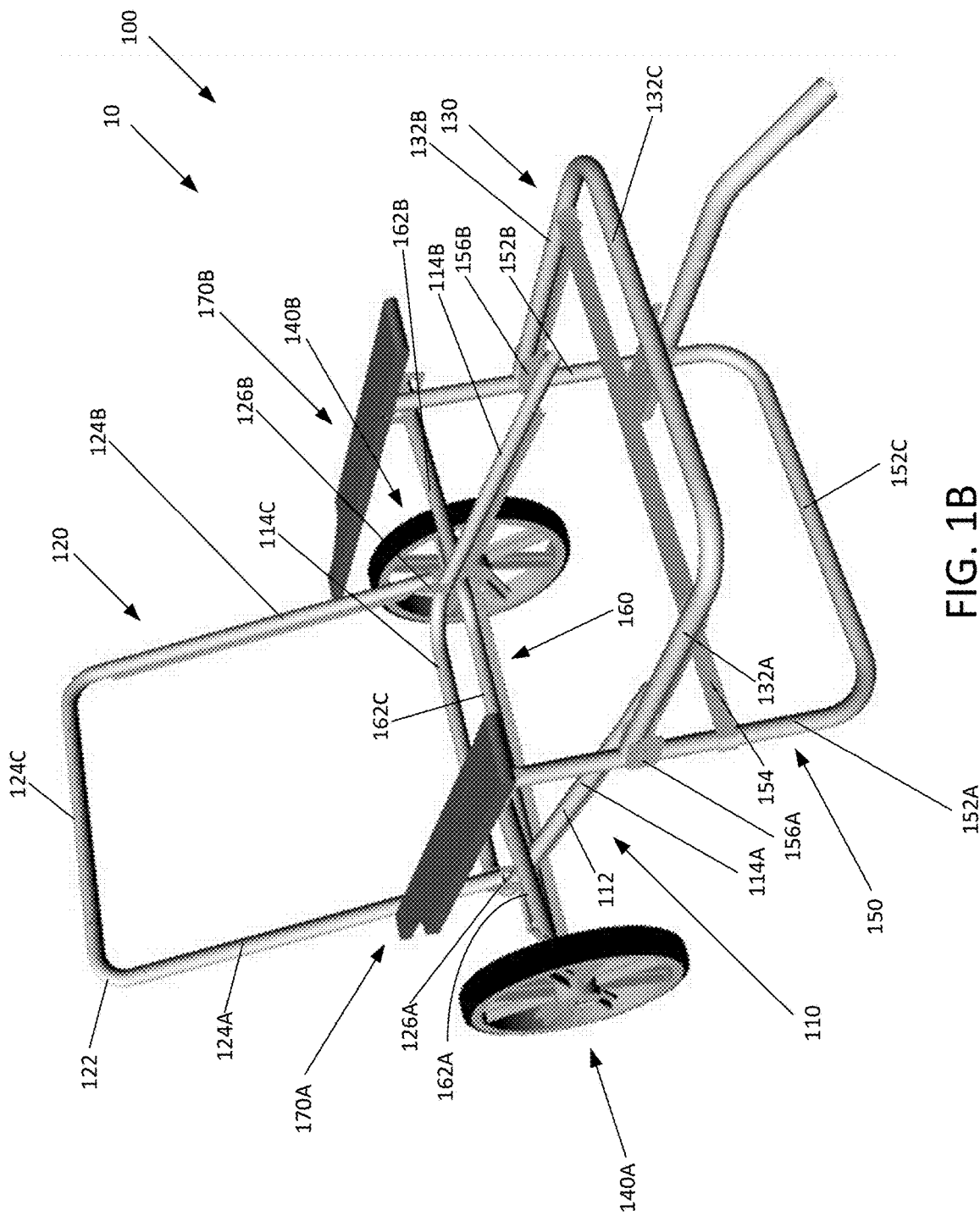
FIG. 1B illustrates a perspective view of the frame of the collapsible support structure shown in FIG. 1A.

Referring to FIG. 1B, illustrated is the frame 100 of the collapsible support structure 10 with the supporting members 105A, 105B, 105C removed. As illustrated, the seat assembly 110 includes a seat member 112. In the illustrated embodiment, the seat member 112 of the frame 100 includes a generally U-shaped bar (e.g., a generally hollow, cylindrical bar) defined by a first arm or portion 114A and a second arm or portion 114B laterally spaced from the first arm 114A by a medial portion or crossbar 114C. Similarly, the seatback assembly 120 includes a seat member 122. In the illustrated embodiment, the seat member 122 of the frame 100 also includes a generally U-shaped bar (e.g., a generally hollow, cylindrical bar) defined by a first arm or portion 124A and a second arm or portion 124B laterally spaced from the first arm 124A by a medial portion or crossbar 124C.

The seatback member 122 is pivotally coupled to the seat member 112. Specifically, the distal portion (e.g., the distal end) of the first seatback arm 124A is pivotally coupled to the first seat arm 114A via a first seating connector 126A disposed proximate the seat crossbar 114C. Similarly, the distal portion (e.g., the distal end) of the second seatback arm 124B is pivotally coupled to the second seat arm 114B via a second seating connector 126B disposed proximate the seat crossbar 114C. Each connector 126A, 126B may be a generally U-shaped connector having an arcuate medial portion contoured to the bars forming the seat member 112. When mounted on the seat member 112, moreover, the seating connectors 126A, 126B are oriented generally upright such that the arms of the "U" extend above the seating surface (as defined by supporting member 105A). When the collapsible support structure 10 is in the deployed position, the seat member 112 is oriented in a generally horizontal position with respect to the support surface, while the seatback member 122 is disposed in a generally vertical position (e.g., it may be oriented angularly offset slightly from vertical) with respect to the support surface. With this configuration, the seat member 112 and the seatback member 122 define the seating or supporting area of the collapsible support structure 10, which is configured to support a user seated therein (or an object placed thereon).

Figure 2A:
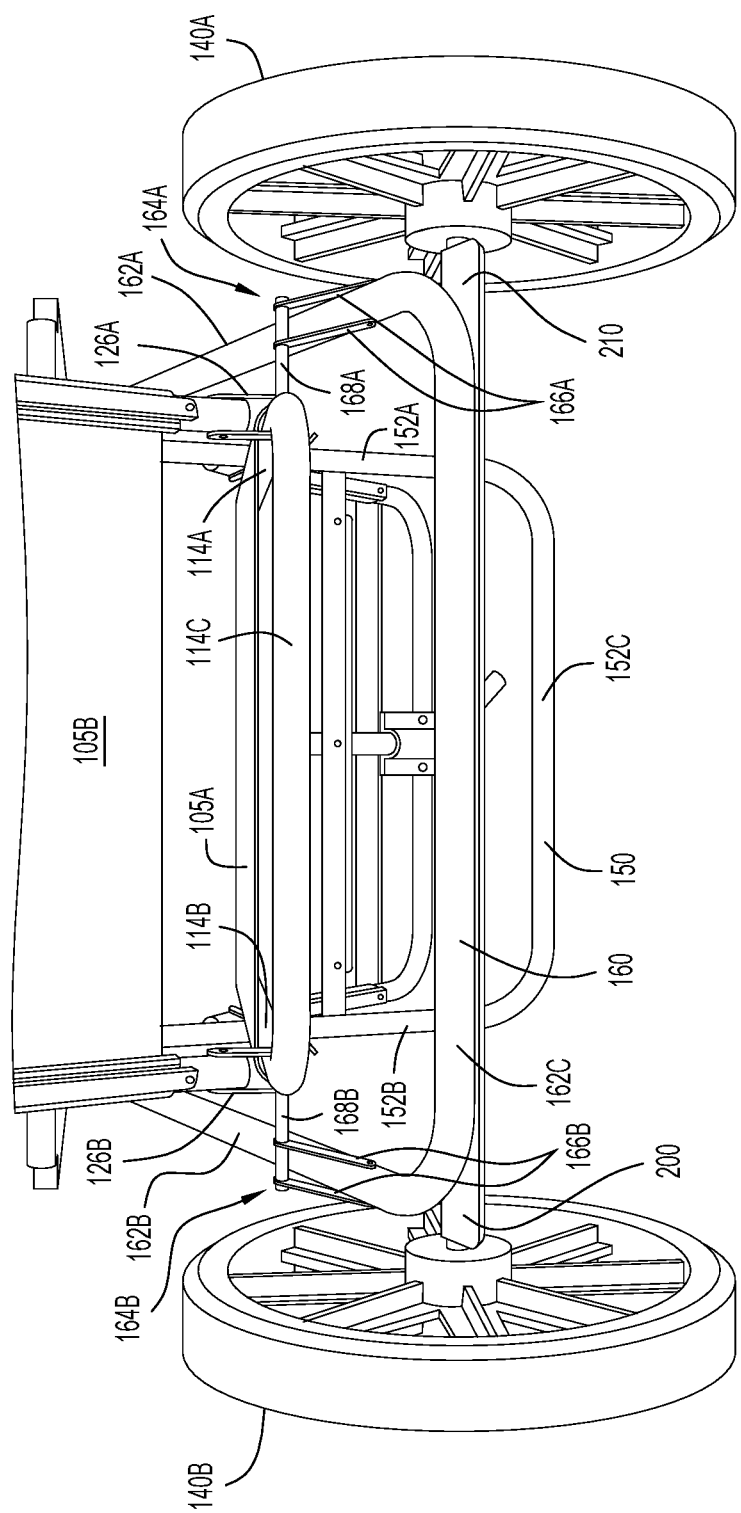
FIG. 2A illustrates a rear view in elevation of the collapsible support structure shown in FIG. 1A.
Figure 2B:
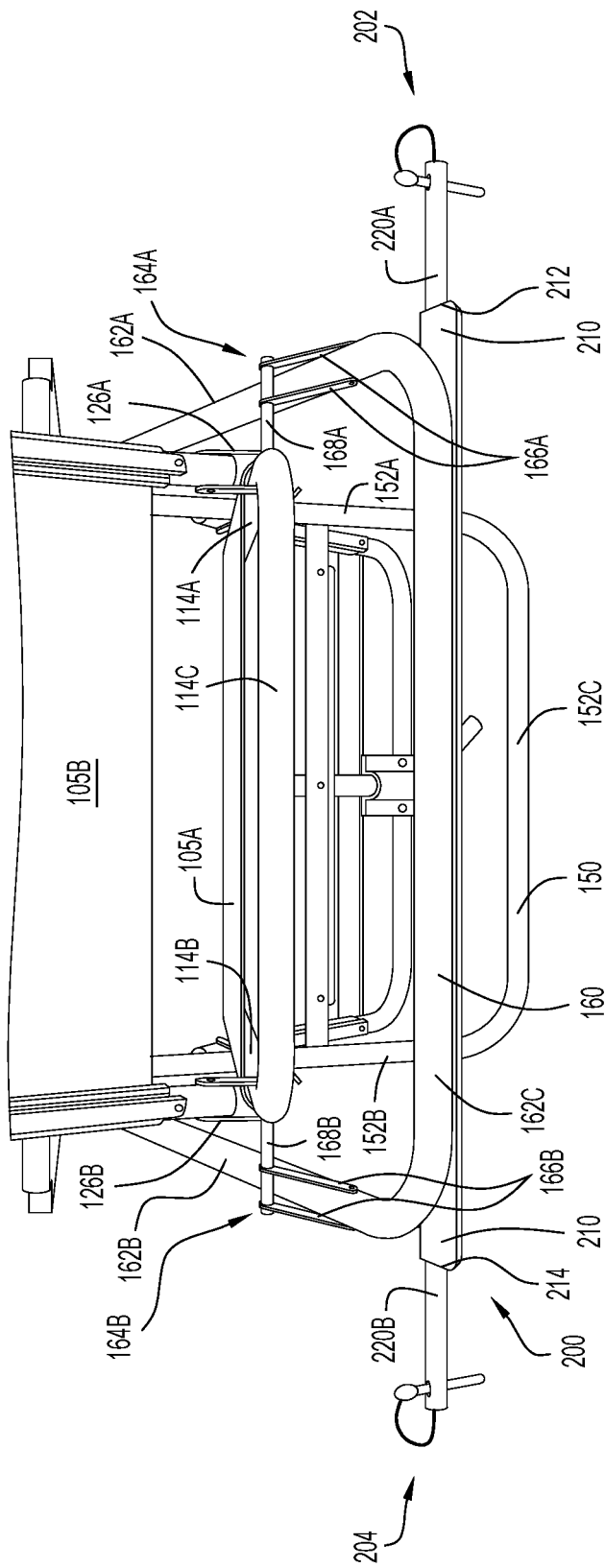
FIG. 2B illustrates a rear view in elevation of the collapsible support structure shown in FIG. 1A, where the wheels are removed from the axles.

As illustrated in FIGS. 1B, 2A, and 2B, the seat assembly 110 of the frame 10 further includes a leg assembly with a first or forward leg member 150 and a second or rearwardly angled leg member 160. The forward leg member 150 may be in the form of a generally U-shaped bar (e.g., a generally hollow, cylindrical bar) including a first upright arm or portion 152A laterally spaced from a second upright arm or portion 152B by a medial or crossbar portion 152C. The second leg member 160, however, may also be in the form of a generally U-shaped bar (e.g., a hollow cylinder). The second leg member 160 includes a first rearwardly positioned or angled arm or portion 162A laterally spaced from a second rearwardly position or angled arm portion 162B by an intermediate portion or crossbar 162C. When the collapsible support structure 10 is in its deployed position (position illustrated in FIGS. 1A and 1B), the crossbar 152C contacts the supporting surface (e.g., the ground).

One or both leg members 150, 160 may further include a cross brace 154 operable to provide additional support to the leg member. In the embodiment shown in FIGS. 1A and 1B, the cross brace 154 on the forward leg member 150 is attached to the front side of the first and second upright arms 152A, 152B (i.e., the side facing away from the collapsible support structure). In this embodiment, the second leg member 160 does not include a cross brace.

Each of the first 150 and second 160 leg members is pivotally coupled to the seat member 112. Specifically, the first arm 152A of the forward leg member 150 is pivotally attached or coupled to the first arm 114A of the seat member 112 (proximate the forward (distal) portion of the seat member first arm 114A), while the second arm 152B of the forward leg member 150 is pivotally attached or coupled to the second arm 114B of the seat member 112 (proximate the forward (distal) portion of the seat member second arm 114B). Forward assembly connector 156A is attached to first arm 152A of forward leg member 150 at the juncture of the attachment of the first arm 152A of forward leg member 150 and first arm 114A of seat member 112. Likewise, forward assembly connector 156B is attached to second arm 152B of forward leg member 150 at the juncture of the attachment of the second arm 152B of forward leg member 150 and second arm 114B of seat member 112. Forward assembly connectors 156A, 156B can be attached at other locations on first arm 152A and second arm 152B of the forward leg member 150, respectively. In one embodiment, each of these forward assembly connectors 156A, 156B may be a generally U-shaped connector having an arcuate medial portion contoured to the first and second arms 152A, 152B of the forward leg member 150, respectively. In another embodiment, each of the forward assembly connectors 156A, 156B may be a pair of bracket plates mounted on opposing sides of the each of the first and second arms 152A, 152B of the forward leg member 150, respectively. For either embodiment of the forward assembly connectors 156A, 156B, when mounted on the forward leg member 150, the forward assembly connectors 156A, 156B are oriented such that the brackets 156A, 156B generally extend forward from the collapsible support structure 10.

As illustrated in FIGS. 2A and 2B, the first rearwardly angled arm 162A of the rearward leg member 160 is coupled to the first arm 114A of the seat member 112 (proximate the crossbar 114C of the seat member 112) via a first rearward leg connector 164A, while the second rearwardly angled arm 162B of the rearward leg member 160 is coupled to the second arm 114B of the seat member 112 (proximate the crossbar 114C of the seat member 112) via a second rearward leg connector 164B. As illustrated, first rearward leg connector 164A includes a pair of elongated brackets 166A and a cylinder 168A. The pair of elongated brackets 166A are attached to opposing sides (e.g., inner and outer sides) of the first rearwardly angled arm 162A, such that the cylinder 168A extends through ends of the elongated brackets 166A and to the first seating connector 126A. Similarly, second rearward leg connector 164B includes a pair of elongated brackets 166B and a cylinder 168B. The pair of elongated brackets 166B are attached to opposing sides (e.g., inner and outer sides) of the second rearwardly angled arm 162B, such that the cylinder 168B extends through ends of the elongated brackets 166B and to the second seating connector 126B. Each of the cylinders 168A, 168B are oriented such that a portion of the cylinders 168A, 168B (i.e., the portion disposed between the brackets 166A, 166B, respectively) contacts the first and second rearwardly angled arms 162A, 162B. This retains the first and second rearwardly angled arms 162A, 162B in the proper position whether the collapsible support structure 10 is in a stowed position or a deployed position, as further detailed below. The cylinders 168A, 168B prevent the first and second rearwardly angled arms 162A, 162B from folding past the first and second seating connectors 126A, 126B.

In its deployed position, the forward leg member 150 is attached to seat member 112 so that the leg member arms 152A, 152B extend below seat member 112 in a manner that is generally perpendicular to the plane defined by the seat member 112. Conversely, in its deployed position, leg member 160 is attached to seat member 112 so that the leg member arms 162A, 162B extend below seat member 112 in a manner that is angled or perpendicular with respect to the seat member 112 (i.e., the leg member arms 162A, 162B are at an angle that is between being perpendicular to the plane defined by the seat member 112 and being parallel to the plane defined by the seat member 112). As noted above, the leg member arms 152A, 152B, 162A, 162B are pivotally attached, or pivotally coupled, to the seat member 112; consequently, the leg members 150, 160 may be pivoted from a deployed configuration to a stowed configuration, in which the leg members 150, 160 are oriented generally parallel to the plane defined by the seat member 112. Additionally, as further described below, the ends of leg member arms 152A, 152B of the forward leg member 150 are pivotally connected to the ends of leg member arms 162A, 162B of the rearward leg member 160 via pins or joining members.

Returning to FIGS. 1A and 1B, the collapsible support structure 10 further includes one or more armrest assemblies 170A, 170B operable to support the arms of a user seated within the seat assembly 110. As further detailed herein, the armrest assemblies 170A, 170B are pivotally coupled to the seatback member 120 and the leg assemblies 150, 160 of the seat member 110. The first armrest assembly 170A is pivotally coupled to the first arm 124A of the seatback member 120 via a pin. Similarly, the second armrest assembly 170B is pivotally coupled to the second arm 124B of the seatback member 120 via a pin. As illustrated, the first armrest assembly 170A spans to, and is supported by, the connection of the ends of the first arms 152A, 162A of the forward 150 and rearward 160 leg members, respectively. The second armrest assembly 170B spans to, and is supported by, the connection of the ends of the second arms 152B, 162B of the forward 150 and rearward 160 leg members, respectively.

As further illustrated in FIGS. 1A and 1B, the forward platform assembly 130 includes a generally U-shaped bar (e.g., a hollow, generally cylindrical bar) defined by a first arm or portion 132A laterally spaced from a second arm or portion 132B via a medial portion or crossbar 132C. The distal portion of the first arm 132A of the forward platform assembly 130 is pivotally coupled to the first forward assembly connector 156A. Similarly, the distal portion of the second arm 132B of the forward platform assembly 130 is pivotally coupled to the second forward assembly connector 156B. With this configuration, the forward platform assembly 130 pivots with respect to the seat member 112 via the pivot connection provided by the forward assembly connectors 156A, 156B. As shown, the distal ends of the arms 132A, 132B may be configured to overlap with the distal ends of the arms 114A, 114B of the seat member 112, with the arms 114A, 114B, 132A, 132B being oriented adjacent and generally parallel to each other when in their deployed positions.

The forward assembly connectors 156A, 156B each include an aperture (not shown). Furthermore, the arms 132A, 132B of the forward platform assembly 130 also each include an aperture (not shown). The apertures of the arms 132A, 132B of the forward platform assembly 130 are oriented such that, when the distal ends of the arms 132A, 132B of the forward platform assembly 130 are oriented in their deployed position (i.e., the arms 132A, 132B of the forward platform assembly 130 overlap, while being oriented generally parallel to, the arms 114A, 114B of the seat member 112), the apertures of the arms 132A, 132B of the forward platform assembly 130 align with the apertures of the forward assembly connectors 156A, 156B. This enables snap buttons (not illustrated) located within the distal ends of the arms 132A, 132B of the forward platform assembly 130 to snap into the apertures of the forward assembly connectors 156A, 156B. Once the snap buttons extend through the apertures of the forward assembly connectors 156A, 156B, the forward platform assembly 130 is locked into position with respect to the seat member 112. When the collapsible support structure 10 is to be stowed, or simply the forward platform assembly is to be stowed, the snap buttons are pushed inward from the apertures of the forward assembly connectors 156A, 156B so that the snap buttons disengage from the apertures of the forward assembly connectors 156A, 156B, which enable the arms 132A, 132B of the forward platform assembly 130 to pivot about the forward assembly connectors 156A, 156B to a stowed position.

Returning to FIGS. 2A and 2B, an axle assembly 200 is disposed on the crossbar 162C of the rearward leg member 160. As further detailed herein, the axle assembly 200 includes a first end 202 and a second end 204. The axle assembly 200 further includes a housing 210 with a first end 212 and a second end 214, the first end 212 of the housing 210 is disposed on the first end 202 of the axle assembly 200 and the second end 214 of the housing 210 disposed on the second end 204 of the axle assembly 200. Slidingly coupled to the housing 210 are a first axle 220A and a second axle 220B. As illustrated in FIG. 2B, the first axle 220A is slidingly coupled to the housing 210 such that the first axle 220A can be configured to extend from the first end 212 of the housing 210 (and subsequently the first end 202 of the axle assembly 200), while the second axle 220B is slidingly coupled to the housing 210 such that the second axle 220B can be configured to extend from the second end 214 of the housing 210 (and subsequently the second end 204 of the axle assembly 200). As best illustrated in FIG. 2A, the first wheel assembly 140A is configured to be rotatably coupled to the first axle 220A when the first axle 220A extends from the first end 212 of the housing 210, while the second wheel assembly 140B is configured to be rotatably coupled to the second axle 220B when the second axle 220B extends from the second end 214 of the housing 210.

Figure 3A:
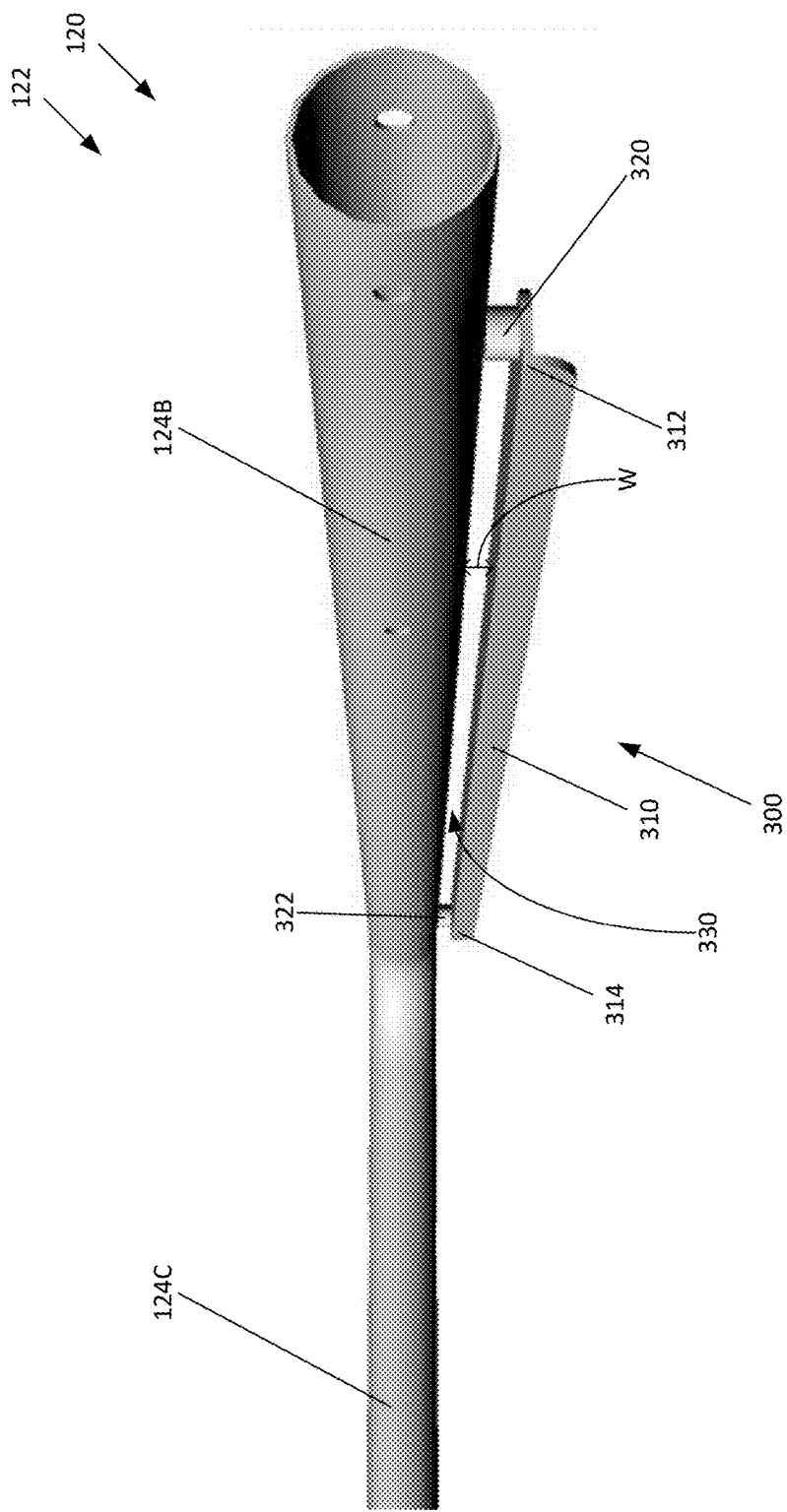
FIG. 3A illustrates a perspective view of a portion of the frame of the collapsible support structure shown in FIG. 1B.
Figure 3B:
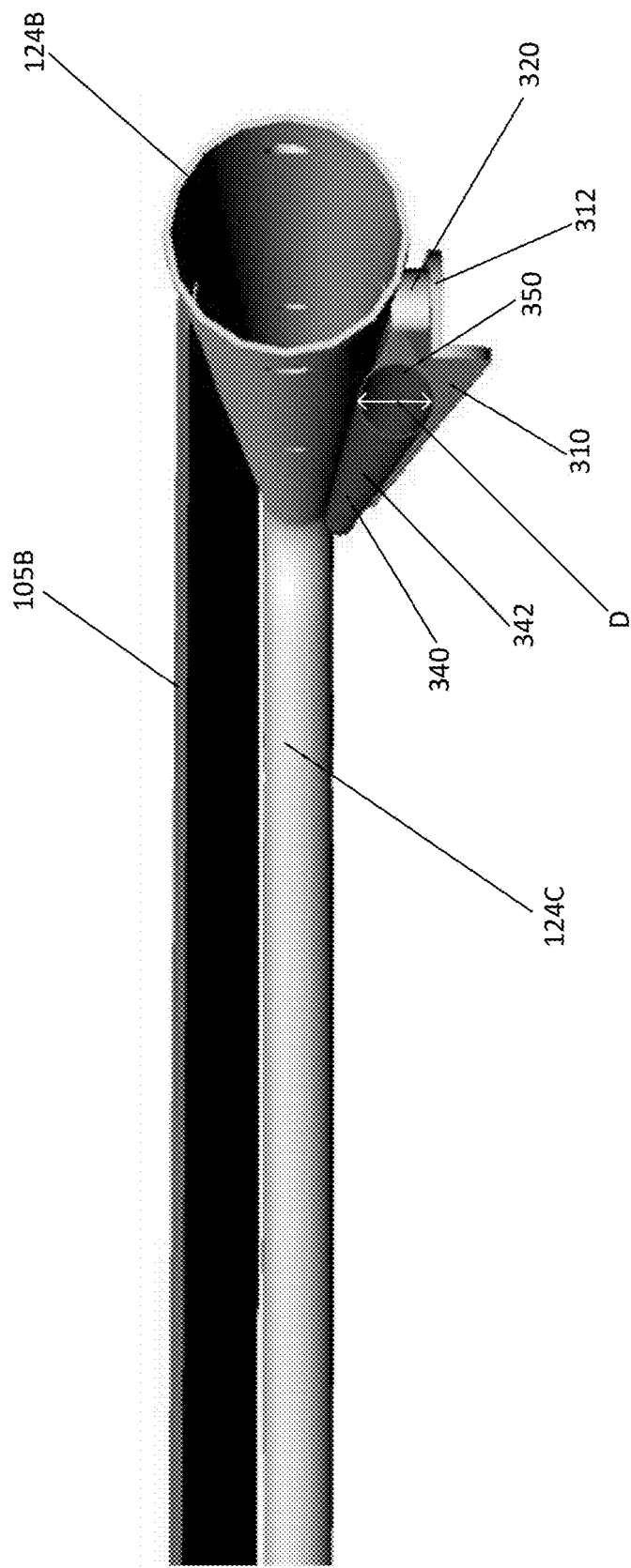
FIG. 3B illustrates a perspective view of the portion of the frame of the collapsible support structure shown in FIG. 3A, where the fabric is attached to the frame of the collapsible support structure.

Turning to FIGS. 3A and 3B, illustrated is the second arm 124B of the seatback member 122 of the seatback assembly 120 with a retaining mechanism 300. While FIGS. 3A and 3B only illustrate the second arm 124B of the seatback member 122 of the seatback assembly 120, the discussion of FIGS. 3A and 3B and of the second arm 124B of the seatback member 122 of the seatback assembly 120 also applies to the first and second arms 114A, 114B of the seat member 112 of the seat assembly 110, the first arm 124A of the seatback member 122 of the seatback assembly 120, and the first and second arms 132A, 132B of the forward platform assembly 130, as each of these arms 114A, 114B, 124A, 132A, 132B are nearly identical to the second arm 124B of the seatback member 122 of the seatback assembly 120. In other words, each of the arms 114A, 114B, 124A, 132A, 132B also includes a retaining mechanism 300 that is similar to that illustrated in FIGS. 3A and 3B.

As illustrated, the retaining mechanism 300 includes an elongate bar 310 with a distal end 312 and a proximal end 314. As best illustrated in FIG. 3A, the distal end 312 of the elongate bar 310 is disposed proximate to the distal end of the second arm 124B of the seatback member 122 of the seatback assembly 120, while the proximal end 314 of the elongate bar 310 is disposed proximate to the proximal end of the second arm 124B of the seatback member 122 of the seatback assembly 120, which is coupled to the crossbar 124C. Thus, the elongate bar 310 spans along the length of the second arm 124B. Moreover, the elongate bar 310 is disposed on the backside of the second arm 124B of the seatback member 122, such that the elongate bar 310 faces rearward of the collapsible support structure 10. Elongate bar 310 may have an angle or other configuration intended to reduce bowing caused by force applied to the elongate bar 310 during use of the retaining mechanism 300.

The elongate bar 310 is coupled to the second arm 124B of the seatback member 122 of the seatback assembly 120 via a pair of spacer elements 320, 322. First spacer element 320 is disposed on the distal end 312 of the elongate bar 310, and second spacer element 322 is disposed on the proximal end 314 of the elongate bar 310. As illustrated, the spacer elements 320, 322 are not only spaced from one another by the length of the elongate bar 310, but also server to space the elongate bar 310 from the surface of the second arm 124B of the seatback member 122. Thus, a slot 330 is disposed between the elongate bar 310 and the second arm 124B, where the slot 330 is defined by the elongate bar 310, the first and second spacers 320, 322, and the second arm 124B. The slot 330 has a width W, which is the distance the elongate bar 310 is disposed from the surface of the second arm 124B of the seatback member 122.

As illustrated in FIG. 3B, a portion of the support member 105B is threaded through the slot 330 of the retaining mechanism 300 disposed on the second arm 124B of the seatback member 122 of the seatback assembly 120. While FIG. 3B only illustrates a portion of the support member 105B being threaded through the retaining mechanism 300 of the second arm 124B of the seatback member 122, the discussion of FIG. 3B and the portion of the support member 105B being threaded through a retaining mechanism 300 also applies to portions of the support members 105A, 105B, 105C being threaded through the retaining mechanisms 300 disposed on the first and second arms 114A, 114B of the seat member 112 of the seat assembly 110, the first arm 124A of the seatback member 122 of the seatback assembly 120, and the first and second arms 132A, 132B of the forward platform assembly 130.

As illustrated in FIG. 3B, the support member 105B includes a first end 340 and a second end (not illustrated). The first end 340 includes a looped portion 342, where the looped portion 342 of the first end 340 is capable of being threaded through the slot 330 of the retaining mechanism 300. In one embodiment, the looped portion 342 may be created by folding and stitching a portion of the first end 340 back onto itself to create a fabric loop in the first end 340 of the support member 105B. The looped portion 342 is expandable and collapsible, where FIG. 3B depicts the looped portion 342 in the expanded configuration. When in the collapsed configuration, the looped portion 342 has a thickness that is less than the width W of the slot 330. However, when reconfigured to the expanded configuration, the looped portion 342 is capable of receiving a retention member 350, where the retention member 350 is inserted into the looped portion 342 such that the retention member 350 spans some or all of the length of the looped portion 342. In some embodiments, the retention member 350 may be greater in length than the elongate bar 310, while in other embodiments, the retention member 350 may be less than or equal to the elongate bar 310 in length. The retention member 350 may be of any shape, including cylindrical, rectangular, triangular, etc. In the embodiment illustrated in FIG. 3B, the retention member 350 is cylindrical in shape with a diameter D.

As illustrated in FIG. 3B, the support member 105B is at least partially wrapped around the second arm 124B of the seatback member 122, where the looped portion 342 of the first end 340 of the support member 105B is inserted through the slot 330 of the retaining mechanism 300. Once inserted through the slot 330, the looped portion 342 is expanded to the expanded configuration, where the cylindrical retention member 350 is inserted into the looped portion 342 of the first end 340 of the support member 105B. Because the diameter D of the cylindrical retention member 350 is greater than the width W of the slot 330, once the cylindrical retention member 350 is threaded through the looped portion 342, the first end 340 can no longer pass through the slot 330 of the retaining mechanism 300. Thus, inserting the cylindrical retention member 350 through the looped portion 342 of the first end 340 of the support member 105B after the looped portion 342 has been inserted through the slot 330 secures the support member 105B to the second arm 124B of the seatback member 122 of the seatback assembly 120.

The retaining mechanism 300 enables the support members 105A, 105B, 105C to be removably attached to the seat assembly 110, seatback assembly 120, and forward platform assembly 130, respectively. Thus, the retaining mechanisms 300 enables a user of the collapsible support structure 10 to remove the support members 105A, 105B, 105C whenever the user of the collapsible support structure 10 desires. For example, the retaining mechanisms 300 enable support members 105A, 105B, 105C that are worn (i.e., torn, faded, stretched, etc.) to be replaced with new unworn support members 105A, 105B, 105C without requiring the user to purchase a new collapsible support structure 10. In addition, the retaining mechanisms 300 also enable the exchange of different types or styles (i.e., team logos, seasonal designs, etc.) of support members 105A, 105B, 105C. The retaining mechanisms 300, moreover, enables more efficient manufacturing of the collapsible support structure 10 because collapsible support structure inventory does not have to be committed to a specific color or design of the support members 105A, 105B, 105C. The support members 105A, 105B, 105C can be quickly added to the collapsible support structure 10 once ordered by a customer.

Figure 4A:
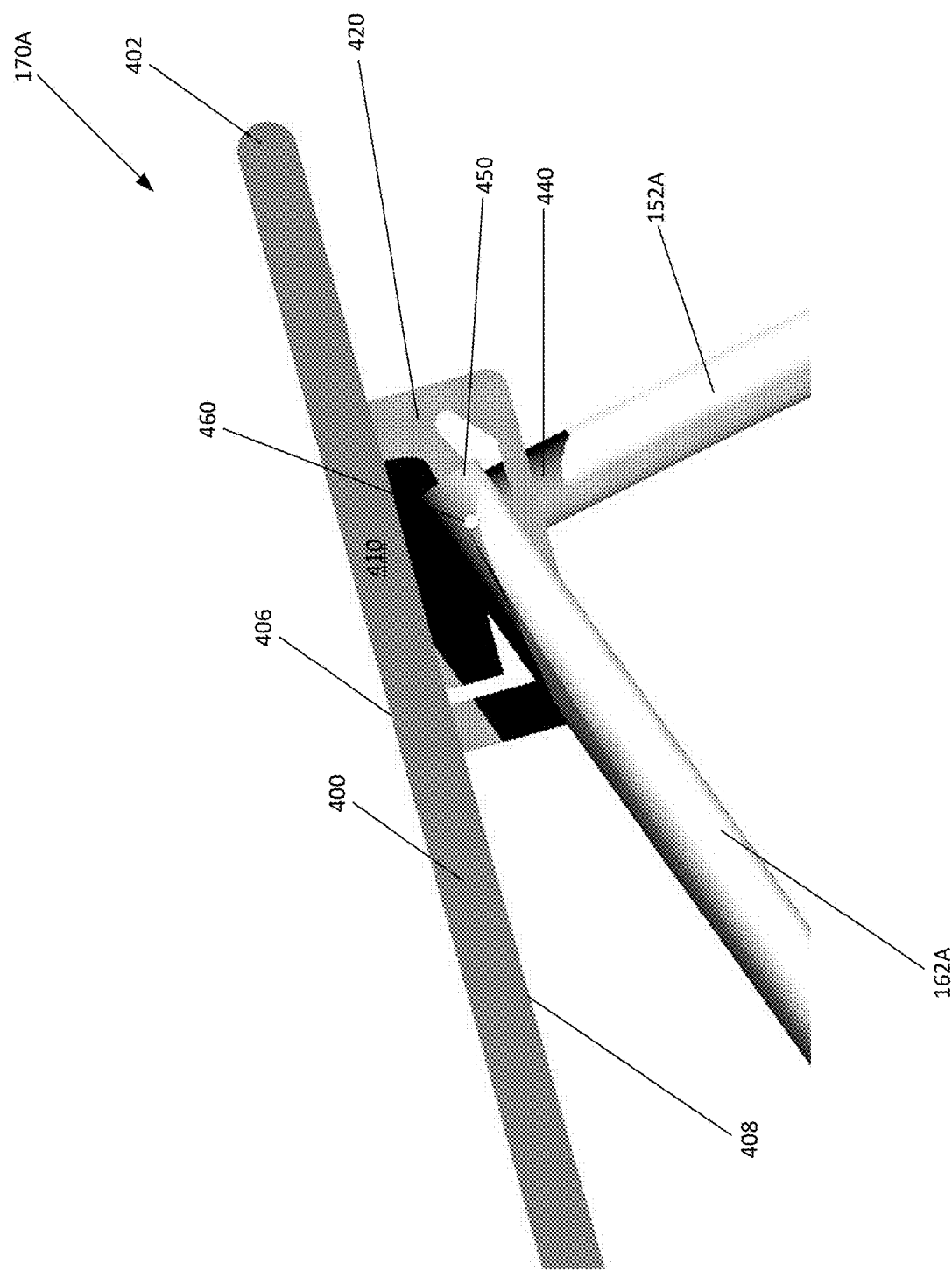
FIG. 4A illustrates a side view in elevation of an armrest assembly of the collapsible support structure shown in FIG. 1A, the armrest assembly shown in isolation.

Turning to FIGS. 4A, 4B, 4C, and 4D, illustrated is the armrest assembly 170A of the collapsible support structure 10. While FIGS. 4A, 4B, 4C, and 4D only illustrate the armrest assembly 170A, the discussion of FIGS. 4A, 4B, 4C, and 4D and armrest assembly 170A applies to armrest assembly 170B, as armrest assembly 170A and armrest assembly 170B are identical, and mirror images, of one another. As illustrated in FIG. 4A, the armrest assembly 170A consists of the armrest 400, the catch plate 420, the distal end 440 of the first upright arm 152A of the forward leg member 150, and the distal end 450 of the first rearwardly angled arm 162A of the rearward leg member 160. As previously explained, the armrest assembly 170A is pivotally coupled to the first arm 124A of the seatback member 120 via a pin, while spanning between the first arm 124A of the seatback member 120 and the connection of the ends 440, 450 of the first arms 152A, 162A of the forward 150 and rearward 160 leg members, respectively.

Figure 4B:
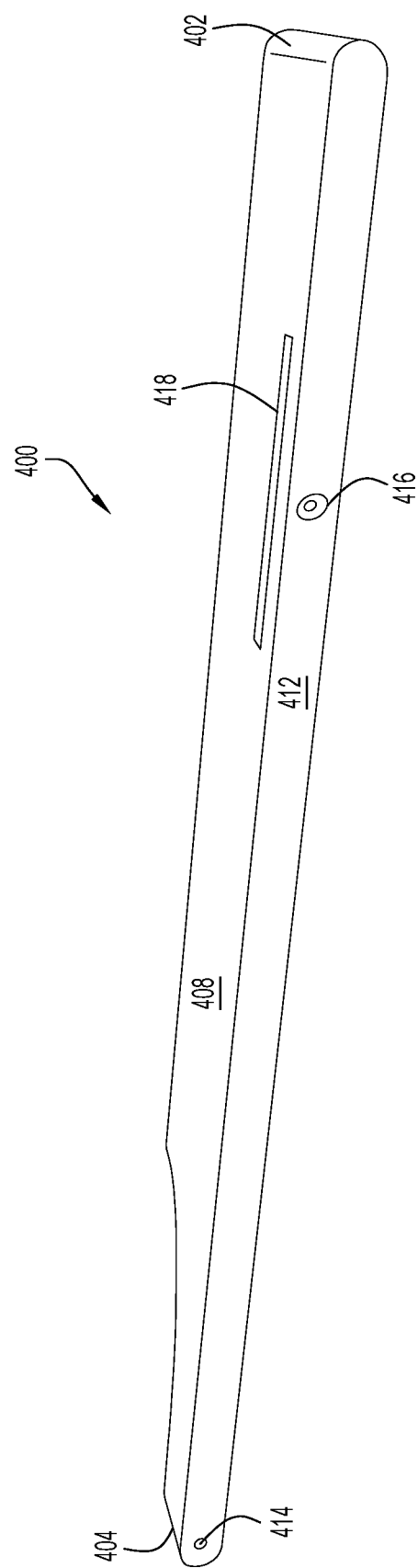
FIG. 4B illustrates a perspective view of the armrest of the armrest assembly shown in FIG. 4A, the armrest shown in isolation.

As illustrated in FIGS. 4A and 4B, the armrest 400 is an elongated member with a first end 402, a second end 404, a top surface 406, and an opposite bottom surface 408. The armrest 400 further includes an outer side surface 410 and an opposite inner side surface 412. As best illustrated in FIG. 4B, the armrest 400 includes an opening 414 disposed on the inner side surface 412 proximate to the second end 404. The armrest 400 further includes an aperture 416 disposed on the inner side surface 412 between the first end 402 and the second end 404, but more proximate to the first end 402 than the second end 404. The bottom surface 408 contains a slit 418 disposed between the first end 402 and the second end 404, but more proximate to the first end 402 than the second end 404. Furthermore, the slit 418 is disposed on the bottom surface 408 of the armrest 400 between the outer side surface 410 and the inner side surface 412, but more proximate to the inner side surface 412 than the outer side surface 410. The slit 418 may be aligned, and in fluid communication, with the aperture 416.

Figure 4C:
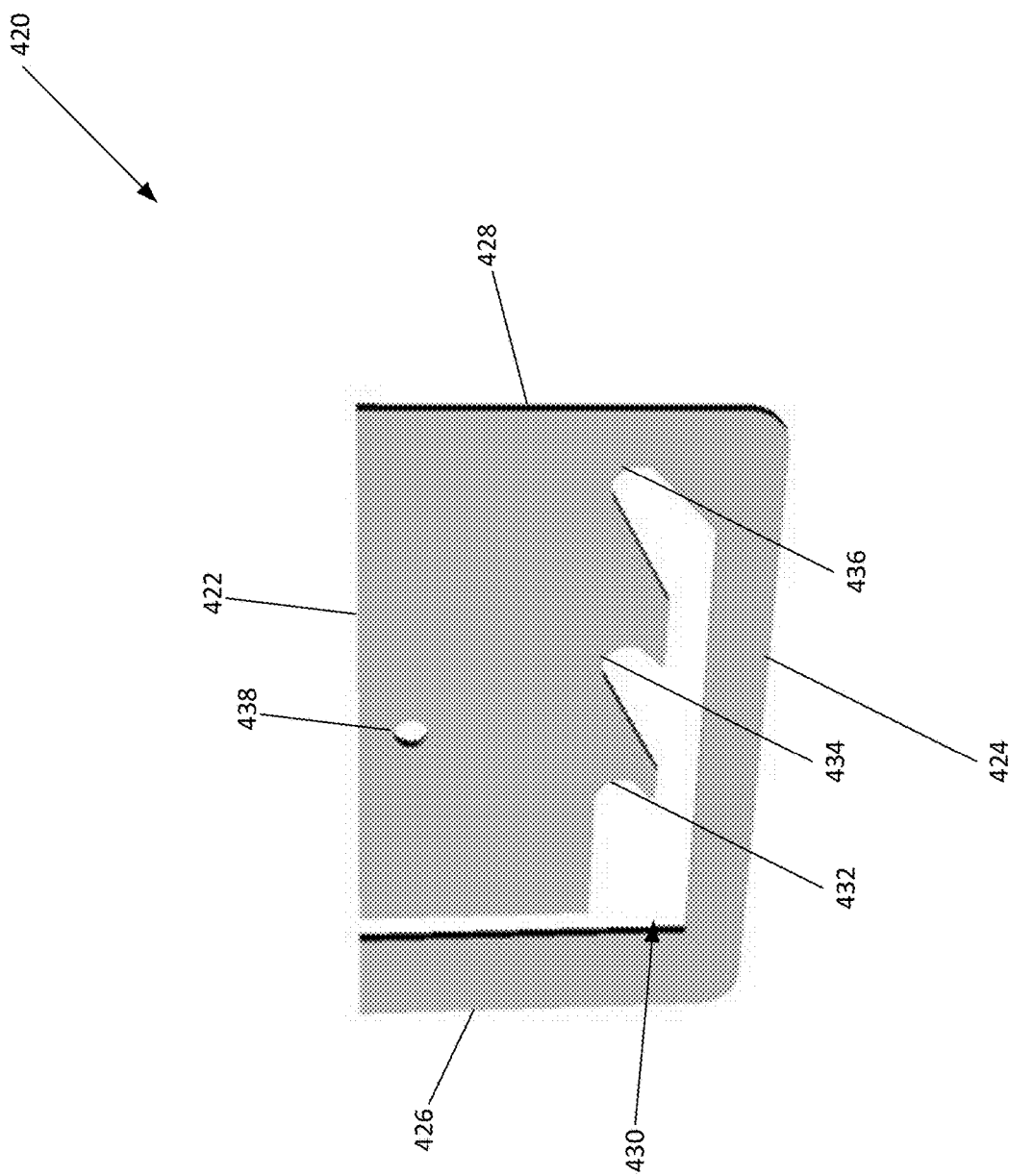
FIG. 4C illustrates a perspective view of the bracket of the armrest assembly shown in FIG. 4A, the bracket shown in isolation.

As illustrated in FIGS. 4A and 4C, the catch bracket 420 is a substantially planar rectangular plate. The bracket 420 includes a top end 422, an opposite bottom end 424, a rear edge 426, and an opposite front edge 428. The bracket 420 further contains an L-shaped slot 430. The slot 430 begins at the top end 422 of the bracket 420 proximate to the rear edge 426, and extends downwardly toward the bottom end 424 of the bracket 420, where the slot 430 changes directions to extend toward the front edge 428 of the bracket 420 before reaching the bottom end 424 of the bracket 420. Thus, the slot 430 contains a substantially vertical portion and a substantially horizontal portion. As illustrated, the horizontal portion contains a plurality of notches or recesses 432, 434, 436, where the first recess 432 is disposed closest to the rear edge 426 of the bracket 420, the third recess 436 is disposed closest to the front edge 428 of the bracket 420, and the second recess 434 is disposed between the first and second recesses 432, 436.

Figure 4D:
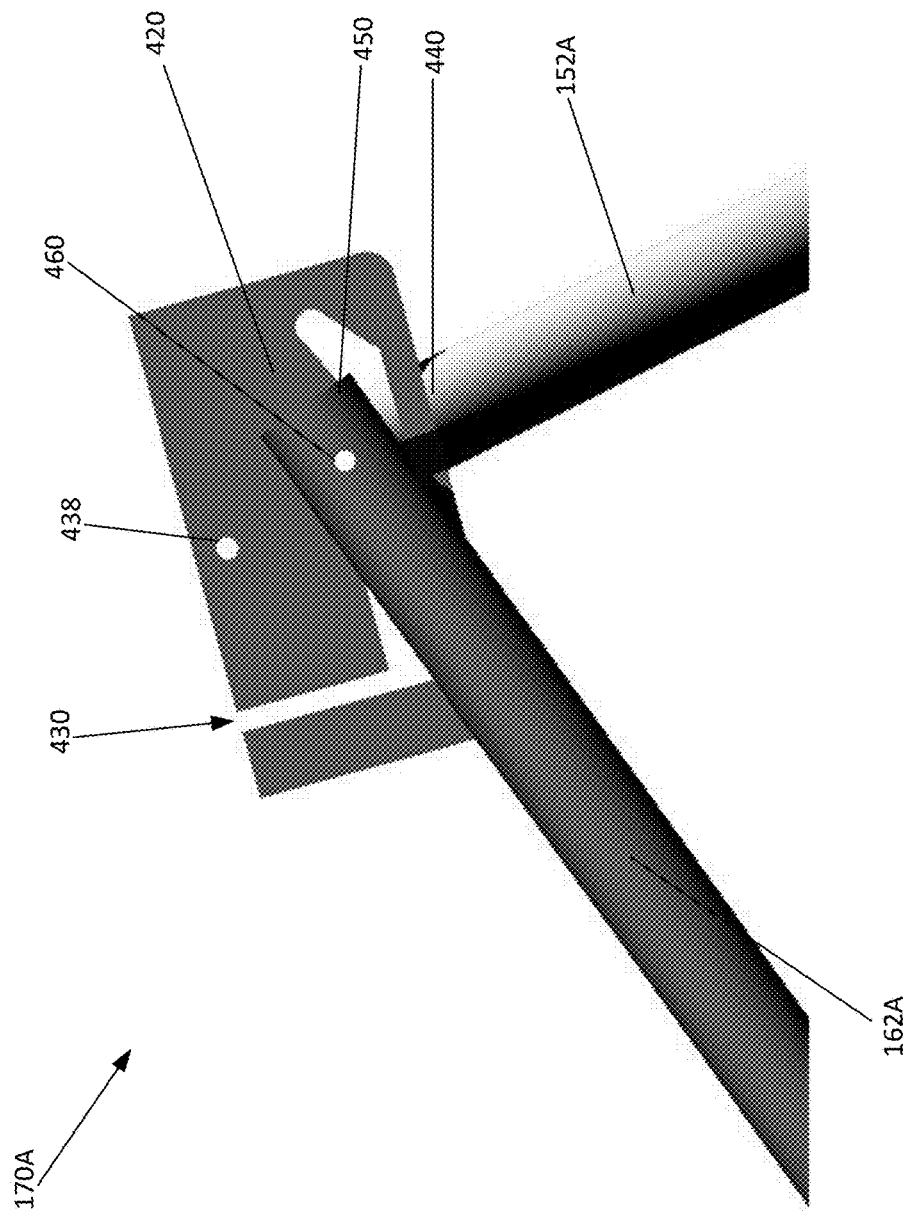
FIG. 4D illustrates a side view in elevation of the armrest assembly shown in FIG. 4A, the armrest being removed.

The catch bracket 420, as illustrated in FIGS. 4C and 4D includes an opening 438 that is disposed proximate to the top edge 422 of the bracket 420. In the embodiment illustrated, the opening 438 is disposed equidistant from the rear edge 426 and the front edge 428 of the bracket 420. The opening 438 is disposed above the substantially horizontal portion of the slot 430.

As best illustrated in FIG. 4D, the distal end 440 of the first arm 152A of the forward leg member 150 is pivotally coupled to the distal end 450 of the first arm 162A of the rearward leg member 160 via a pin 460. Thus, the distal ends 440, 450 of the arms 152A, 162A, respectively, are configured to rotate with respect to one another about an axis extending through the pin 460.

In assembling the arm assembly 170A, once the distal ends 440, 450 of the arms 152A, 162A have been coupled to one another via pin 460, the catch bracket 420 is positioned between the distal end 440 of the first arm 152A of the forward leg member 150 and the distal end 450 of the first arm 162A of the rearward leg member 160. The catch bracket 420 is positioned between the distal ends 440, 450 of the arms 152A, 162A such that the portion of the pin 460 disposed between the distal ends 440, 450 of the arms 152A, 162A is inserted into the slot 430 of the catch bracket 420. Once the catch bracket 420 is placed in the position illustrated in FIG. 4D, the armrest 400 is lowered onto the catch bracket 420 such that the catch bracket 420 is inserted through the slit 418 on the bottom surface 408 of the armrest 400, and the opening 438 of the bracket 420 is aligned with the aperture 416 on the inner side surface 412 of armrest 400. Once the opening 438 of the bracket 420 is aligned with the aperture 416 on the inner side surface 412 of armrest 400, a fastener (e.g., screw, pin, etc.) can be inserted through both the aperture 416 and the opening 438 to secure the top edge 422 of the catch bracket 420 within the slit 418 of the armrest 400. This also secures the armrest 400 to the catch bracket 420.

Once assembled, in operation, the first end 402 of the armrest 400 can be partially lifted, which also partially lifts catch bracket 420 such that the pin 460 is disposed along the bottom edge of the slot 430 of the catch bracket 420 rather than in one of the recesses 432, 434, 436. The armrest 400 and the catch bracket 420 can then be simultaneously slid backwards or forwards until the pin 460 is aligned with the desired recess 432, 434, 436. Once positioned, the armrest 400 and the catch bracket 420 can then be lowered so that the pin 460 slides within the desired recess 432, 434, 436. Because the second end 404 of the armrest 400 is pivotally pinned to the first arm 124A of the seatback member 122 of the seatback assembly 120, movement of the armrest 400 and the catch bracket 420 in this manner repositions the angle of the seatback assembly 120 with respect to the seat assembly 100. The number of positions of the armrest 400 and the catch bracket 420, and consequently the seatback assembly 120, may be based on the number of recesses 432, 434, 436 disposed in the slot 430 of the catch bracket 420.

Figure 5A:
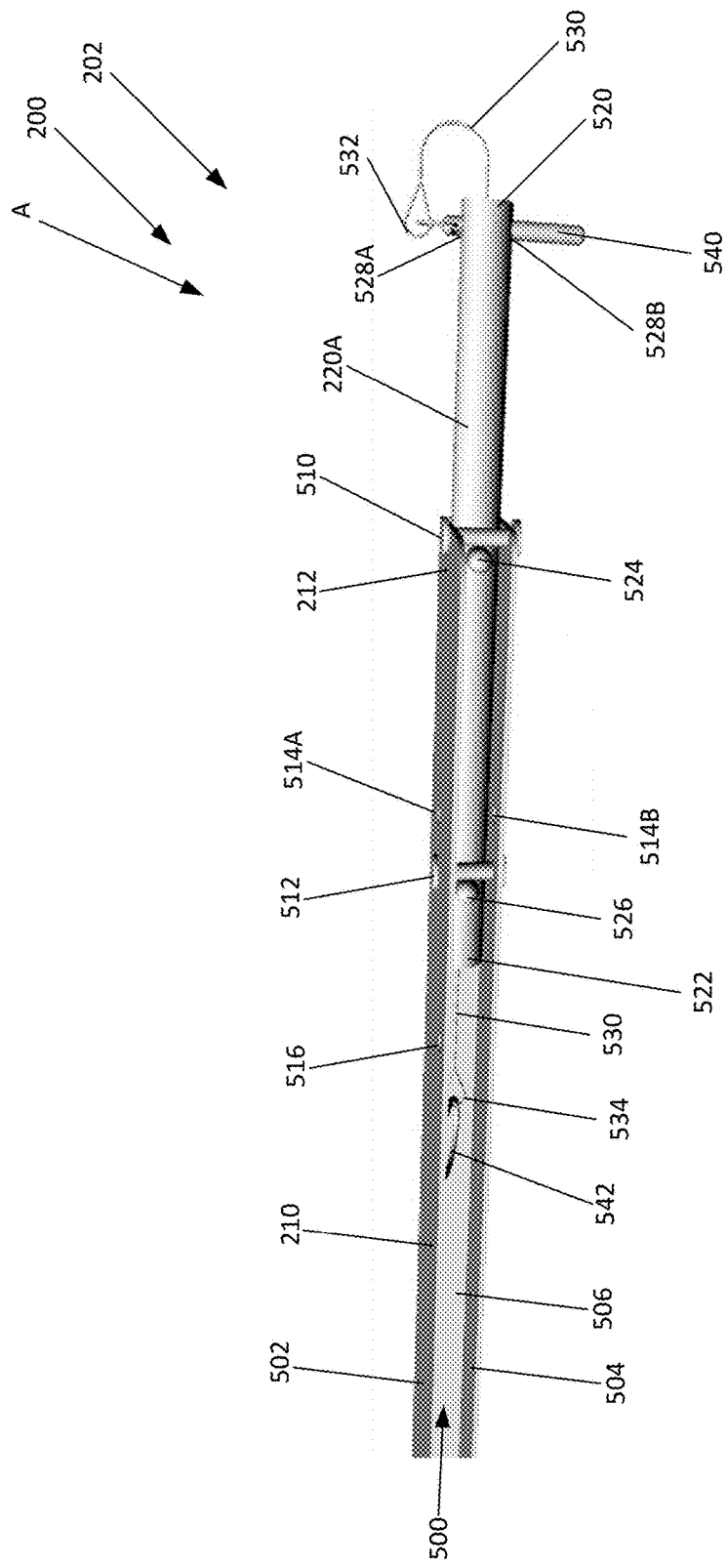
FIG. 5A illustrates a perspective view of the axle assembly of the collapsible support structure shown in FIG. 1A, the axle assembly shown in isolation with the axle in a deployed position.
Figure 5B:
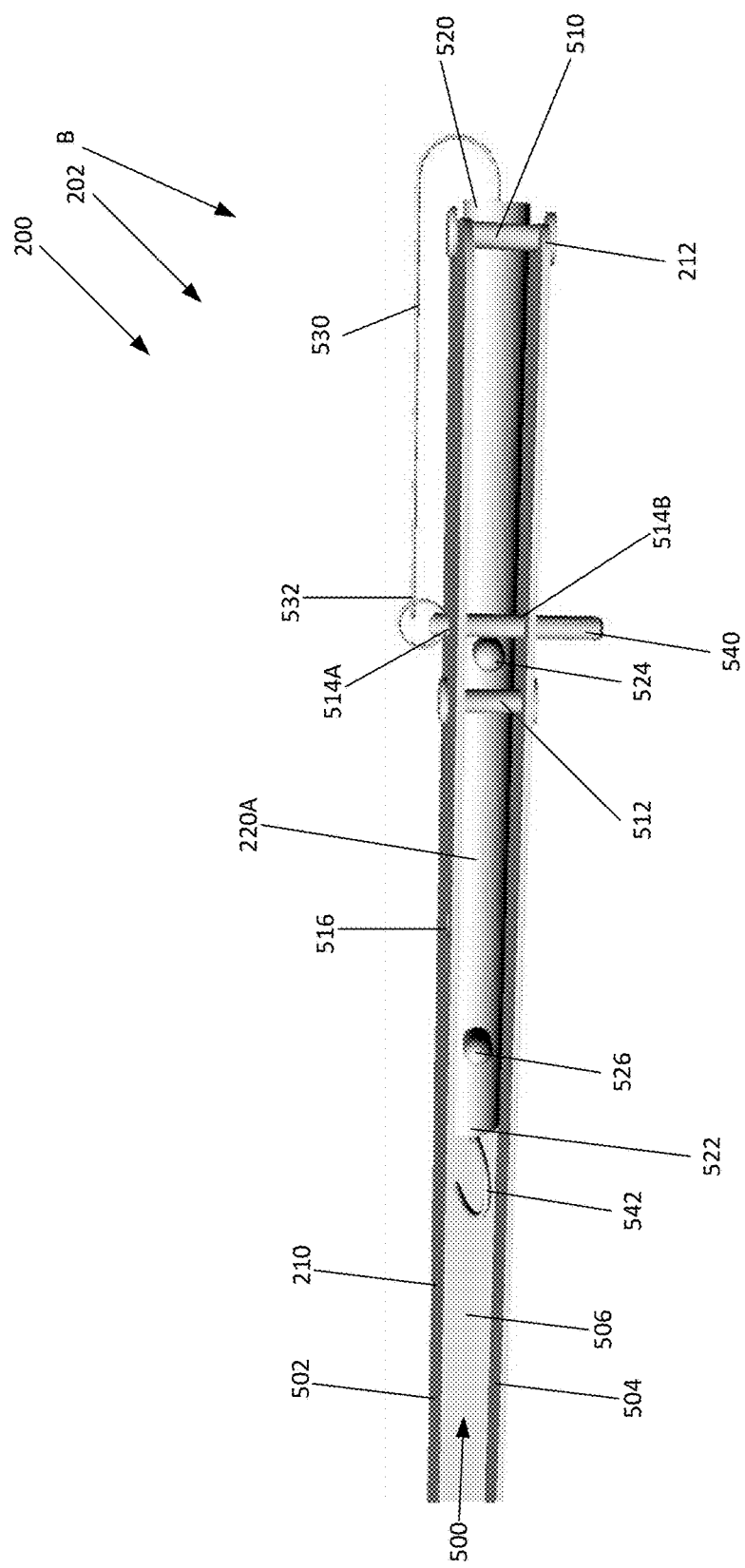
FIG. 5B illustrates a perspective view of the axle assembly shown in FIG. 5A, where the axle is in a stowed position.
Figure 5C:
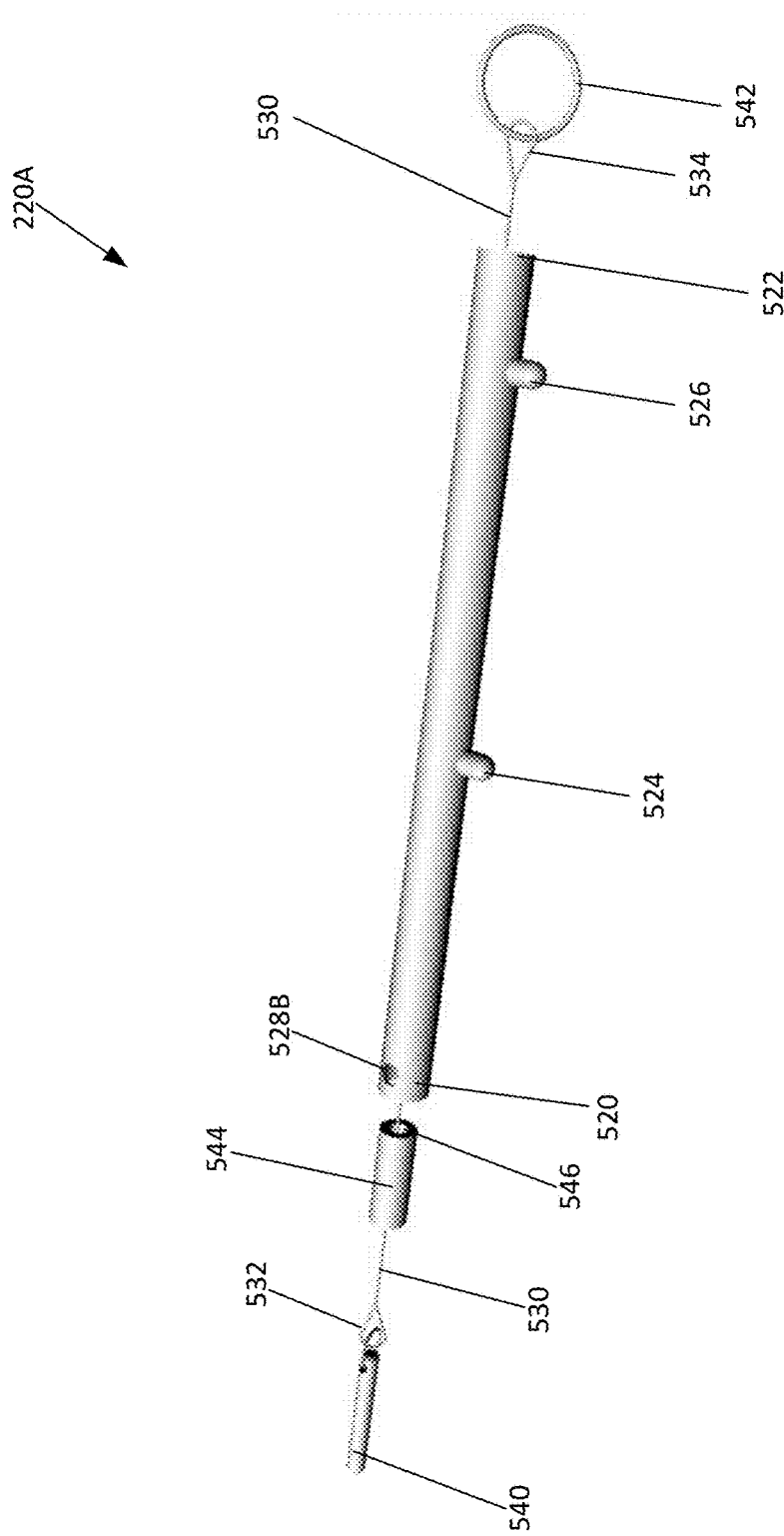
FIG. 5C illustrates a perspective view of the axle of the axle assembly shown in FIG. 5A.

Turning to FIGS. 5A, 5B, and 5C, illustrated is the first end 202 of the axle assembly 200 of the collapsible support structure 10 with the wheels removed for illustration. While FIGS. 5A, 5B, and 5C only illustrate the first end 202 of the axle assembly 200, the discussion of FIGS. 5A, 5B, and 5C applies to the second end 204 of axle assembly 200, which is identical, but mirrored, to first end 202 of the axle assembly 200. As previously explained, the axle assembly 200 includes a housing 210 that is coupled to, and extends along, the crossbar 164C of the rearward leg member 160 (illustrated in FIGS. 2A and 2B). As illustrated in FIGS. 5A, 5B, and 5C, the housing 210 includes three sides 502, 504, 506 that form a channel 500 with an open side that faces in the rearward direction of the collapsible support structure 10. Thus, a cross section of the channel is substantially U-shaped. Moreover, the first end 212 of the housing 210 includes two bolts 510, 512 that intersect the channel 500 of the housing 210 by extending through the top side 502 of the housing 210 and the bottom side 504 of the housing 210. The first bolt 510 extends through the housing 210 proximate to the first end 212 of the housing 210. The second bolt 512 extends through the housing 210 at a location spaced from both the first end 212 of the housing 210 and the first bolt 510. In addition, the housing 210 includes a pair of first openings 514A, 514B disposed between the first bolt 510 and the second bolt 512, but disposed more proximate to the second bolt 512 than the first bolt 510. Opening 514A is disposed in the top side 502 of the housing 210, while opening 514B is disposed in the bottom side 504 of the housing 210, where the first pair of openings 514A, 514B are aligned within one another. Furthermore, the housing 210 also includes a second opening 516 disposed in the top side 502 of the housing 210. The second opening 516 is spaced from the first end 212 of the housing 210, such that the second opening 516 is spaced farther from the first end 212 of the housing 210 than the second bolt 512 (i.e., the second bolt 512 is disposed between the first end 212 of the housing 210 and the second opening 516).

As further illustrated, an axle 220A is slidingly engaged within the channel 500, such that the bolts 510, 512 retain the axle 220A within the channel 500 of the housing 210. While FIGS. 5A, 5B, and 5C only illustrate the first axle 220A, the discussion of FIGS. 5A, 5B, and 5C applies to the second axle 220B that is identical, but mirrored, to the first axle 220A, and is illustrated in FIG. 2B. First axle 220A includes a first end 520 and a second end 522. First axle 220A further includes a first protrusion 524 and a second protrusion 526. The first protrusion 524 is disposed within and extending from the first axle 220A at a location disposed between the first end 520 and the second end 522 of the first axle 220A. The second protrusion 526 is disposed within and extending from the first axle 220A at a location proximate to the second end 522 of the first axle 220A. The first and second protrusions 524, 526 extend through openings in the sidewall of the first axle 220A, and are oriented to extend in a rearward direction (i.e., in the same direction as that of the open side of the housing 210). Thus, the first and second protrusions 524, 526 extend in a rearward direction that is substantially parallel with the support surface on which the collapsible support structure 10 sits. As best illustrated in FIGS. 5A and 5C, the first end 520 of the first axle 220A also includes a pair of openings 528A, 528B that are aligned on opposing sides of the first axle 220A (FIG. 5C only illustrates opening 528B).

The axle 220A is hollow, where a tether 530 is threaded through the hollow axle 220A. The tether 530 includes a first end 532 and a second end 534. The tether 530 is longer in length than the first axle 220A such that the first and second ends 532, 534 of the tether 530 are capable of extending through opposing ends 520, 522 of the first axle 220A. As best illustrated in FIG. 5C, a pin 540 is coupled to the first end 532 of the tether 530, while a ring 542 is coupled to the second end 534 of the tether 530. The ring 542 is sized larger (i.e., has a larger diameter) than the diameter of the first axle 220A, which prevents the ring 542 and the second end 534 of the tether 530 from being pulled through the second end 522 of the first axle 220A. Furthermore, the pin 540 is sized and shaped to be inserted through the pair of openings 528A, 528B on the first end 520 of the first axle 220A and the pair of openings 514A, 514B of the housing 210.

The hollow first axle 220A further includes a sleeve 544 that is cylindrical in shape. A central passage 546 is concentrically disposed through the sleeve 544 in the lengthwise direction. As best illustrated by FIG. 5C, the tether 530 is threaded through the central passage 546 of the sleeve 544. The passage 546 contains a diameter that is smaller than the diameter of the pin 540 and the diameter of the ring 542, preventing both the pin 540 and the ring 542 from passing through the passage 546. Moreover, the sleeve 544 contains a diameter that is smaller than the diameter of the hollow first axle 220A, such that the sleeve 544 may be positioned within the interior of the hollow first axle 220A. The sleeve 544 has a diameter that enables the sleeve 544 to be inserted into the interior of the hollow first axle 220A via the first end 520, but is prevented from sliding entirely through the hollow first axle 220A by the portion of the first protrusion 524 that is also disposed within the interior of the hollow first axle 220A. Thus, the sleeve 544 may be inserted into the first end 520 of the hollow first axle 220A until the sleeve 544 abuts the first protrusion 524 within the interior of the hollow first axle 220A. The diameter of the passage 546 prevents the pull pin 540 and first end 532 of the tether 530 from being pull entirely through the hollow first axle 220A when a user pulls on the tether 530 via the ring 542.

Turning to FIGS. 5A and 5B, illustrated is the first axle 220A in a deployed position A and a stowed position B. As illustrated in FIG. 5A, where the first axle 220A is in the deployed position A, the first end 520 of the first axle 220A extends beyond the first end 212 of the housing 210, while the second end 522 of the first axle 220A is disposed within the channel 500 of the housing 210 proximate to the second bolt 512. As illustrated, the first and second bolts 510, 512 of the housing 210 are spaced from one another the same distance that the first and second protrusions 524, 526 are spaced from one another. Thus, as illustrated in FIG. 5A, when the first axle 220A is in the deployed position A, the first protrusion 524 abuts the first bolt 510, and the second protrusion 526 abuts the second bolt 512. The abutment of the first and second protrusions 524, 526 against the first and second bolts 510, 512 prevents the first axle 220A from completely sliding out from the channel 500 when being repositioned to the deployed position A. When in the deployed position A, the pin 540 may be removed from the openings 528A, 528B of the first end 520 of the first axle 220A, and the ring 542 may be pulled away from the second end 522 of the first axle 220A to cause the pin 540 to slide into the interior of the first axle 220A and abut the sleeve 544 within the interior of the first axle 220A. At this point, a wheel 140A may be slid onto the portion of the first axle 220A that extends from the first end 212 of the housing 210. The pin 540 can then be reinserted through the pair of openings 528A, 528B on the first end 520 of the first axle 220A to secure the wheel 140A onto the first axle 220A.

To reconfigure the first axle 220A from the deployed position A to the stowed position B, the pin 540 is first removed from the pair of openings 528A, 528B on the first end 520 of the first axle 220A, and the wheel 140A is removed from the first axle 220A. The first axle 220A is then slid into the housing 210 along the channel 500 until the first protrusion 524 contacts, or comes into abutment with, the second bolt 512 of the housing 210. With the first protrusion 524 in abutment or in proximity with the second bolt 512, the pin 540 is then inserted through the pair of openings 514A, 514B of the housing 210 to secure the first protrusion 524 of the first axle 220A between the pin 540 and the second bolt 512. This secures the first axle 220A in the secured position B, and prevents the first axle 220A from sliding out of the second end 212 of the axle housing 210. As best illustrated in FIG. 5B, when the first axle 220A is in the secured position B, the first end 520 of the first axle 220A is in alignment with, or proximate to, the first end 212 of the housing 210. When in the stored position B, the first axle 220A is not capable of receiving the wheel 140A.

Referring to FIGS. 6A-6C, the collapsible support structure 10 is illustrated demonstrating the folding process, where the collapsible support structure 10, when embodied as a foldable chair, is folded from its deployed position in FIG. 6A to its stowed position in FIG. 6C. For illustrative purposes, the forward platform assembly 130 and the axle assembly 200, including the wheels 140, 140B, have been removed from the collapsible support structure 10. As illustrated in FIG. 6A, the collapsible support structure 10 is in the deployed position with the seatback assembly 120 oriented substantially perpendicular to the seat assembly 110. Furthermore, the armrest assemblies 170A, 170B extend substantially parallel from the front of the seat assembly 110. As illustrated in FIGS. 6B and 6C, the seatback assembly 120 is folded towards the seat assembly 110. The seatback assembly 120 pivots with respect to the seat assembly 110 about the first and second seating connectors 126A, 126B. The seatback assembly 120 pivots about the first and second seating connectors 126A, 126B from a position substantially perpendicular to the seat assembly 110 to a position substantially parallel to the seat assembly 110. Because of the connection of the seat assembly 110 to the forward leg member 150, the connection of the seat assembly 110 to the rearward leg member 160 via the rearward leg connectors 164A, 164B, and the connection of the seatback assembly 120 to the forward leg member 150 and the rearward leg member 160 via the arm assemblies 170A, 170B, when the seatback assembly 120 is folded forward to be parallel with the seat assembly 110, the forward leg member 150 and rearward leg member 160 are pivoted to be substantially parallel to the seat assembly 110, as illustrated in the stowed position of FIG. 6C. Even if the collapsible support structure 10 is embodied as another structure, such as a foldable cart, the folding process for collapsible support structure 10 may be substantially similar to that illustrated in FIGS. 6A-6C.

Figure 7A:
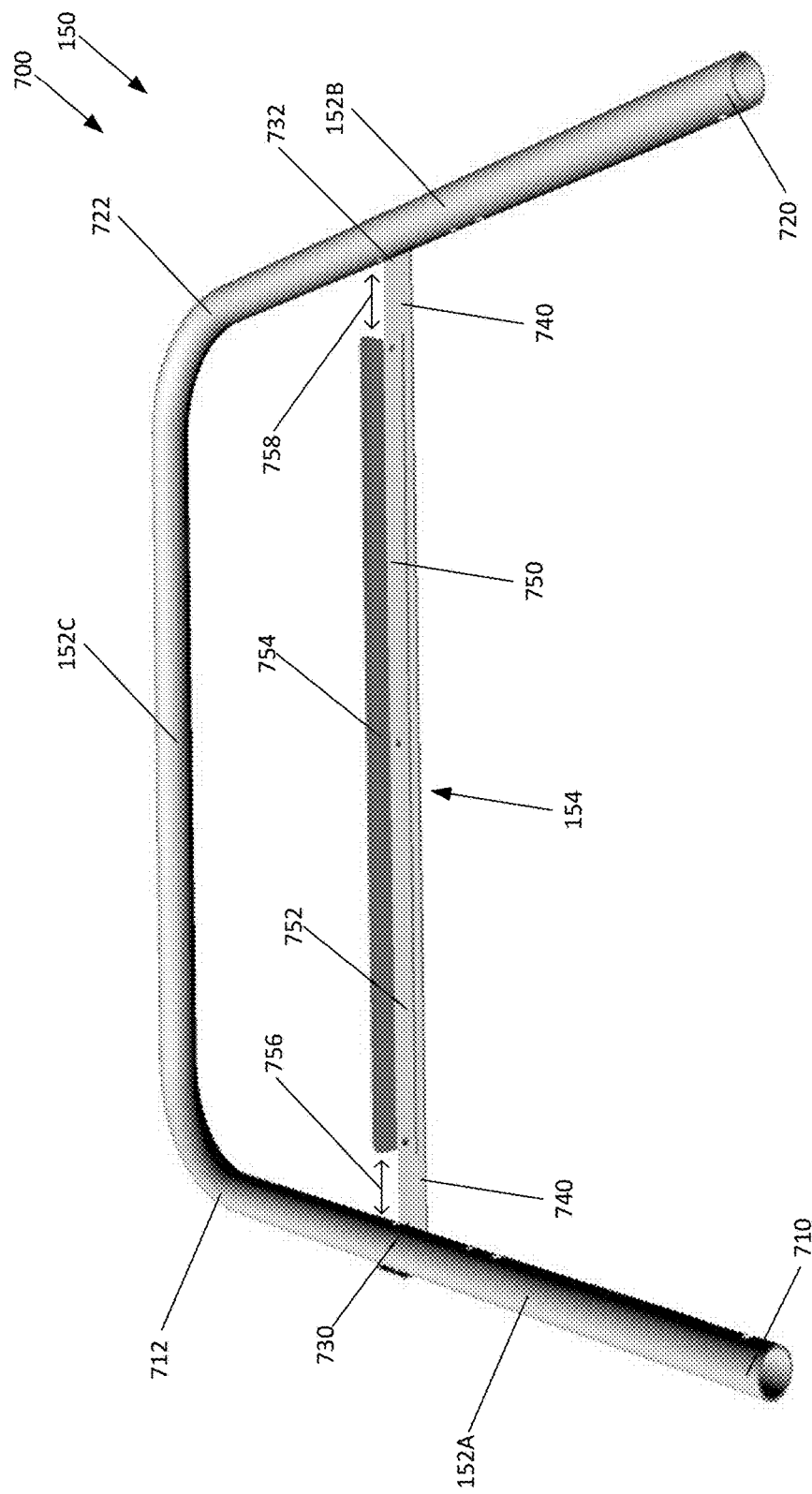
FIG. 7A illustrates a rear view of the front leg assembly of the collapsible support structure shown in FIG. 1A.
Figure 7B:
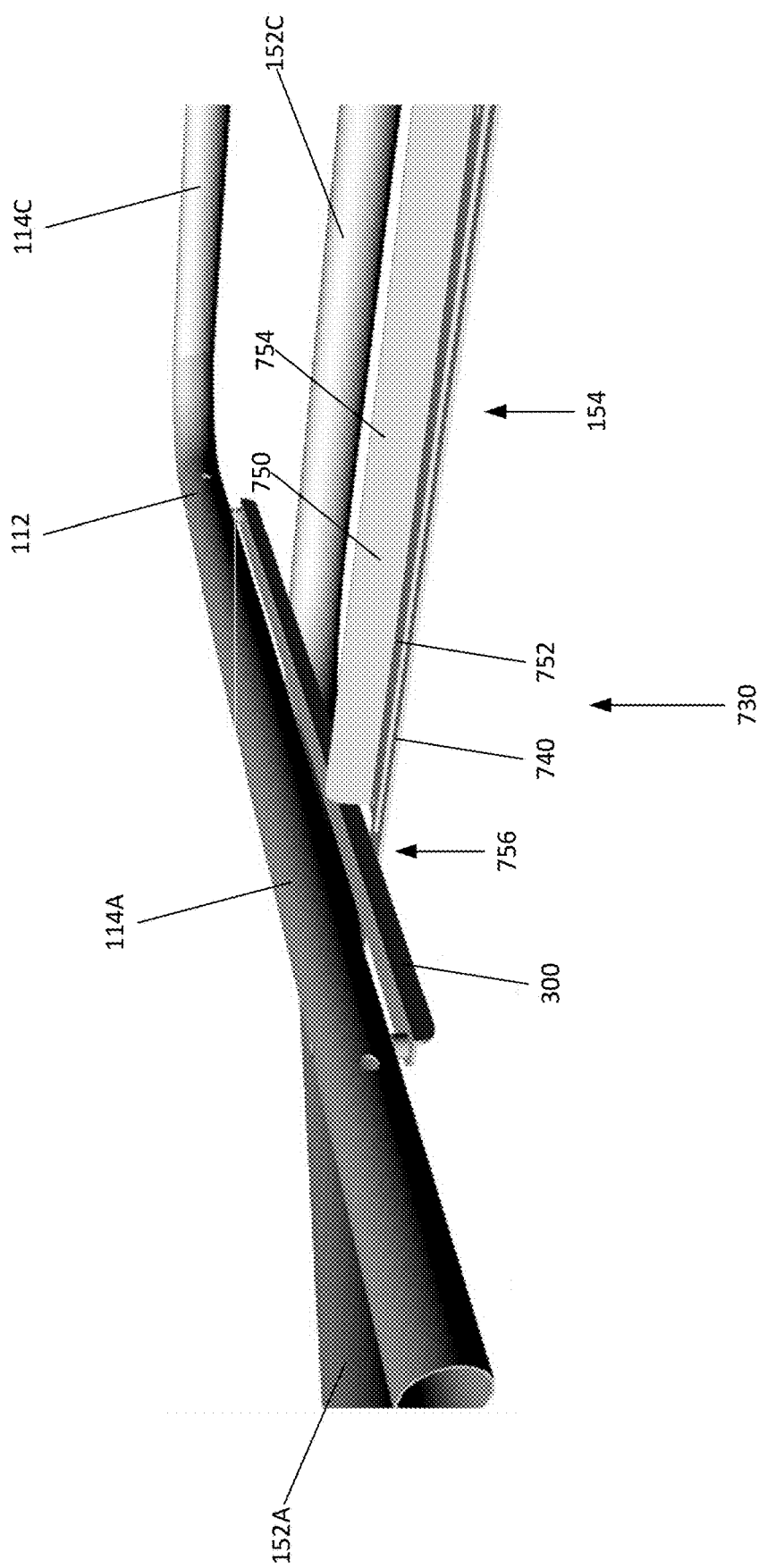
FIG. 7B illustrates a perspective view of the front leg assembly folded against the seat assembly of the collapsible support structure shown in FIG. 1A.

Turning to FIGS. 7A and 7B, illustrated is the forward leg member 150, where FIG. 7A illustrates the rear side 700 of the forward leg member 150. As previously explained, the forward leg member 150 may be in the form of a generally U-shaped bar (e.g., a generally hollow, cylindrical bar) including a first upright arm or portion 152A laterally spaced from a second upright arm or portion 152B by a medial or crossbar portion 152C. The first arm portion 152A includes a distal end 710 and an opposite proximal end 712, where the proximal end 712 of the first arm portion 152A is coupled to the crossbar portion 152C. Similarly, the second arm portion 152B includes a distal end 720 and an opposite proximal end 722, where the proximal end 722 of the second arm portion 152B is coupled to the crossbar portion 152C.

As illustrated in FIG. 7A, and as previously explained, the forward leg member 150 further includes a cross brace 154 spanning between the first arm portion 152A and the second arm portion 152B, where the cross brace 154 includes a first end 730 and a second end 732. The first end 730 of the cross brace 154 is coupled to the first arm portion 152A at a location intermediate the distal end 710 and the proximal end 712 of the first arm portion 152A. The second end 732 of the cross brace 154 is coupled to the second arm portion 152B at a location intermediate the distal end 720 and the proximal end 722 of the second arm portion 152B.

The cross brace 154 includes two components, a substantially flat or planar cross element 740 and a substantially angled element 750. As illustrated in FIG. 7A, the flat cross element 740 is longer in length than the angled element 750, where the flat cross element 740 spans the entire distance between the first arm portion 152A and the second arm portion 152B. The flat cross element 740 is oriented such that the flat cross element 740 is attached to, and crosses, the front side of the first and second arm portions 152A, 152B. The angled element 750 includes a first face 752 and a second face 754, where the first and second faces 752, 754 are angled with respect to one another. In one embodiment, the first and second faces 752, 754 form a right angle. The first face 752 of the angled element 750 is coupled to the rear side of the flat cross element 740 such that the second face 754 extends in the rearward direction from the first face 752. The angled element 750 is centrally disposed on the rear side of the flat cross element 740 such that gaps 756, 758 are disposed between the arm portions 152A, 152B and the angled element 750. The first gap 756 is disposed between the end of the angled element 750 and the first arm portion 152A, while the second gap 758 is disposed between the end of the angled element 750 and the second arm portion 152B. The first and second gaps 756, 758 are substantially equal in length.

The angled element 750 being coupled to the rear side of the flat cross element 740 adds structural support to the cross brace 154. If the forward leg member 150 includes a cross brace 154 with only the flat cross element 740, when in the deployed position, similar to that illustrated in FIGS. 1A, 1B, and 6A, the cross brace 154 may not be strong or sturdy enough to prevent the first and second arm portions 152A, 152B of the forward leg member 150 from bending under the weight of a user sitting on the seat member 112. The weight of a user sitting in the seat member 112 may cause deflection or bending in the flat cross element 740 without the angled element 750, which in turn causes the first and second arm portions 152A, 152B of the forward leg member 150 to bend. This could cause damage, or ultimately destruction, of the forward leg member 150. The angled element 750 provides additional structural support to the flat cross element 740, preventing deflection of the flat cross element 740 when the forward leg member 150 experiences the weight of a user sitting on the seat member 112. More specifically, the second face 754, which extends in the rearward direction from the first face 752, prevents the angled element 750, and ultimately the flat cross element 740 from bending under the weight of a user sitting in the seat member 112.

As illustrated in FIG. 7B, the forward leg member 150 is folded against the seat member 112, like that illustrated in FIG. 6C. While FIG. 7B only illustrates the first end 730 of the cross brace 154, the first arm portion 152A of the forward leg member 150, and the first arm portion 114A of the seat member 112, the discussion of FIG. 7B applies to the second end 732 of the cross brace 154, the second arm portion 152B of the forward leg member 150, and the second arm portion 114B of the seat member 112, which are identical to the first end 730 of the cross brace 154, the first arm portion 152A of the forward leg member 150, and the first arm portion 114A of the seat member 112. As previously explained, coupled to the first arm portion 114A of the seat member 112 is a retaining mechanism 300, which, along with the retaining mechanism 300 coupled to the second arm portion 114B of the seat member 112, is configured to retain the support member 150A on the seat member 112. Because, as best illustrated in FIG. 1B, the forward leg member 150 is wider than the seat member 112, when the forward leg member 150 is folded under the seat member 112, the cross brace 154 is folded against the bottom side of the seat member 112.

The gaps 756, 758 of the cross brace 154 enable the forward leg member 150 to fold more closely against the bottom side of the seat member 112. As illustrated in FIG. 7B, because the retaining mechanism 300 is coupled to the bottom of the first arm portion 114A of the seat member 112, when the forward leg member 150 is folded under the seat member 112 and against the bottom of the seat member 112, the retaining mechanism 300 is received by the gap 756 between the first arm portion 152A of the forward leg member 150 and the angled element 750 of the cross brace 154. Similarly, while not illustrated, the gap 758 between the second arm portion 152B of the forward leg member 150 and the angled element 750 of the cross brace 154 receives the retaining mechanism 300 coupled to the bottom of the second arm portion 114B of the seat member 112 when the forward leg member 150 is folded under and against the bottom of the seat member 112.

Figure 8A:
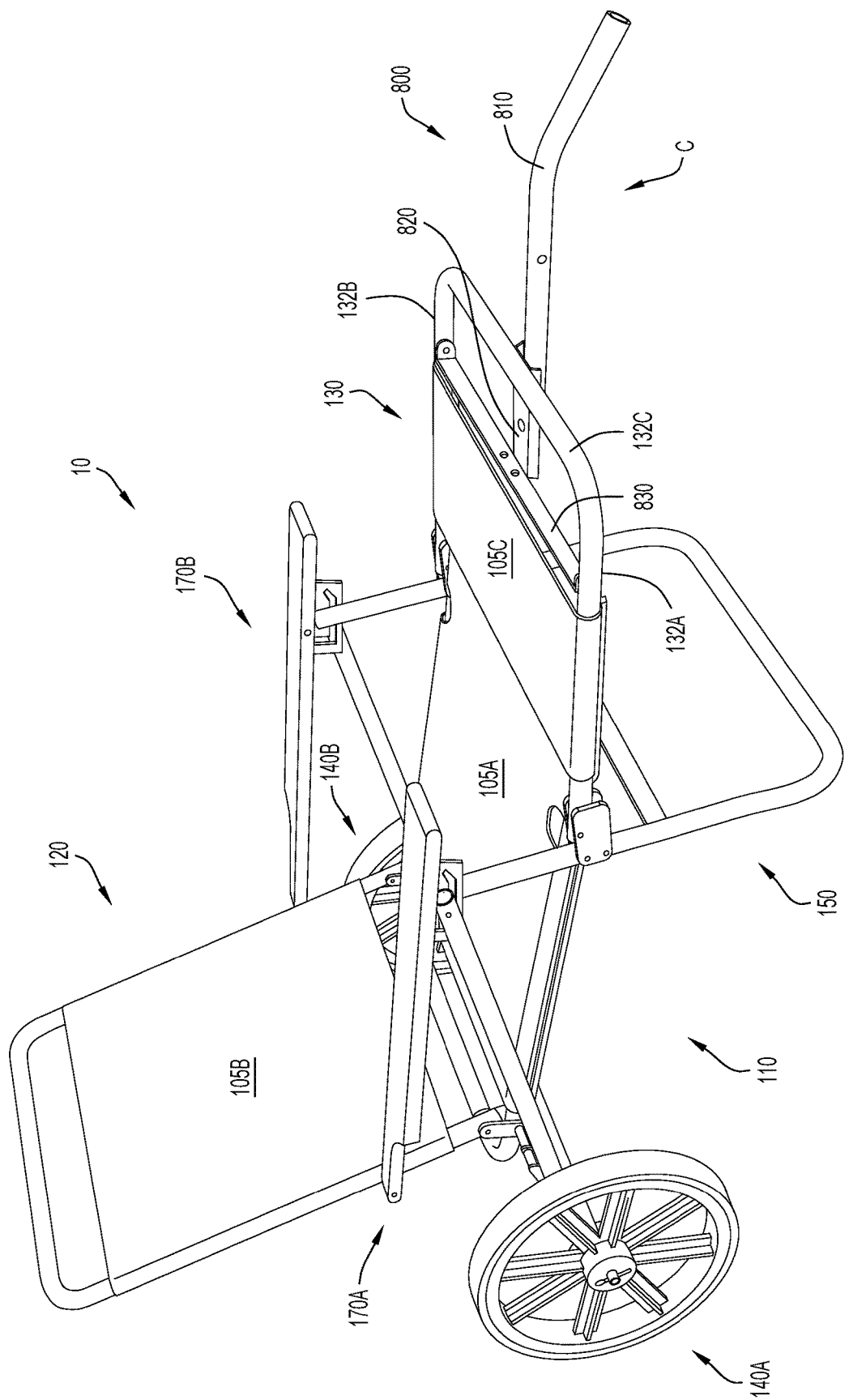
FIG. 8A illustrates a perspective view of the collapsible support structure shown in FIG. 1A, the front platform assembly and the handle oriented in a deployed position to serve as a collapsible support structure to transport items.
Figure 8B:
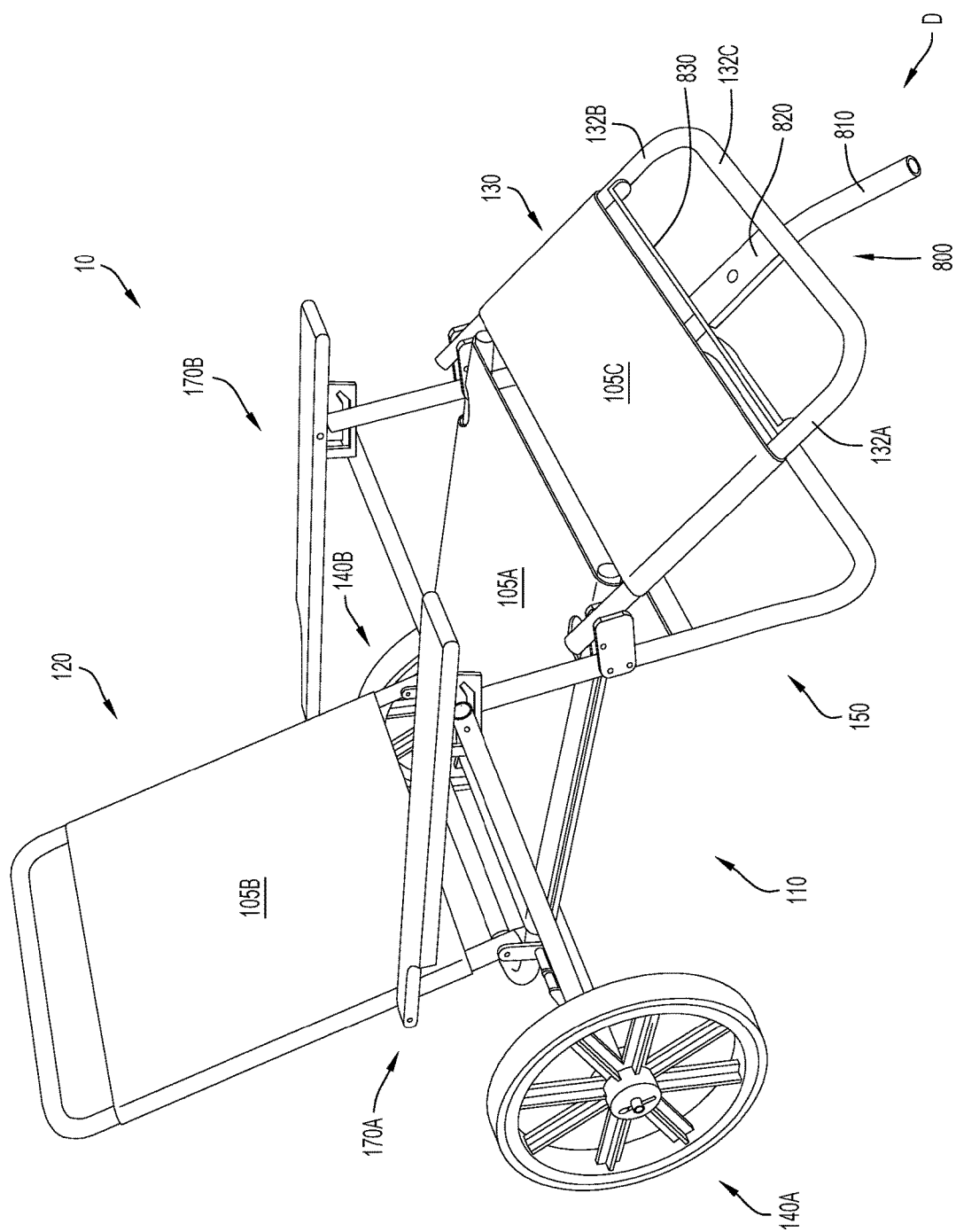
FIG. 8B illustrates a perspective view of the collapsible support structure shown in FIG. 8A, the front platform assembly and the handle oriented in a position for the collapsible support structure to serve as a chair.

Turning to FIGS. 8A and 8B, the forward platform assembly 130 includes a handle assembly 800 illustrated in a deployed configuration C and a stowed configuration D. As illustrated, the handle assembly 800 includes a handle portion 810 and a housing portion 820. As further illustrated, the forward platform assembly 130 includes a cross brace 830 that extends between first arm portion 132A and second arm portion 132B of the forward platform assembly 130 at a location spaced from the crossbar 132C. The cross brace 830 of the forward platform member 130 is substantially perpendicular to the crossbar 132C of the forward platform assembly 130. As further illustrated, the housing portion 820 of the handle assembly 800 is coupled to both the crossbar 132C and the cross brace 830 of the forward platform member 130. Thus, the housing portion 820 of the handle assembly 800 extends between the crossbar 132C and the cross brace 830 of the forward platform member 130. The housing portion 820 is coupled to both the crossbar 132C and the cross brace 830 at central locations of the crossbar 132C and the cross brace 830.

As further explained below, the handle portion 810 of the handle assembly 800 is slidably and rotatably coupled to the housing portion 820 of the handle assembly 800. As illustrated in FIGS. 8A and 8B, the handle portion 810 extends farther from the housing portion 820, and thus farther from the crossbar 132C of the forward platform member 130, when in the deployed configuration C (FIG. 8A) than when the handle portion 810 is in the stowed configuration D (FIG. 8B).

Figure 9A:
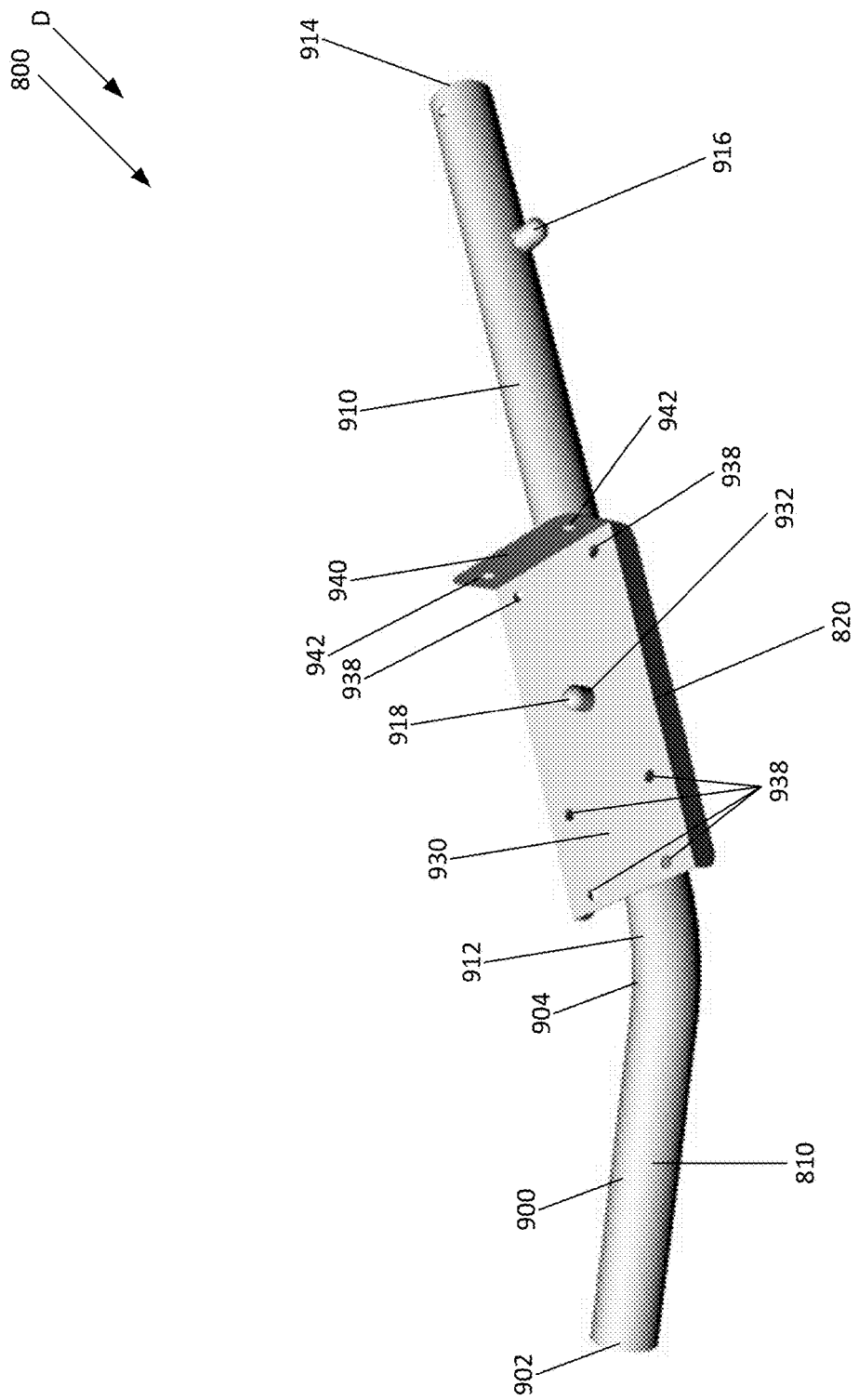
FIG. 9A illustrates a top view of the handle assembly of the collapsible support structure shown in FIG. 1A, the handle oriented in the stored position.
Figure 9B:
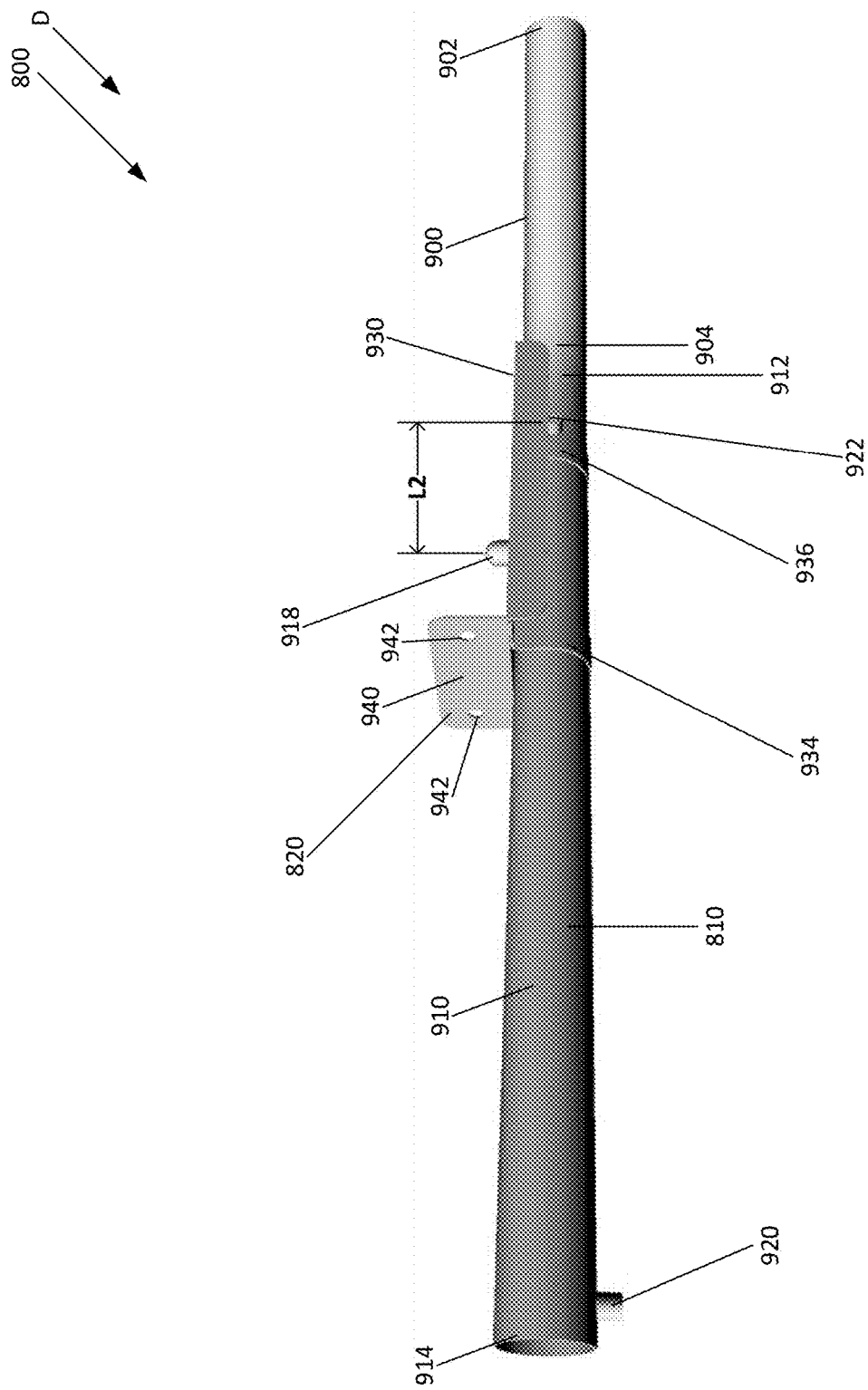
FIG. 9B illustrates a perspective view of the handle assembly shown in FIG. 9A, the handle oriented in the stored position.
Figure 9C:
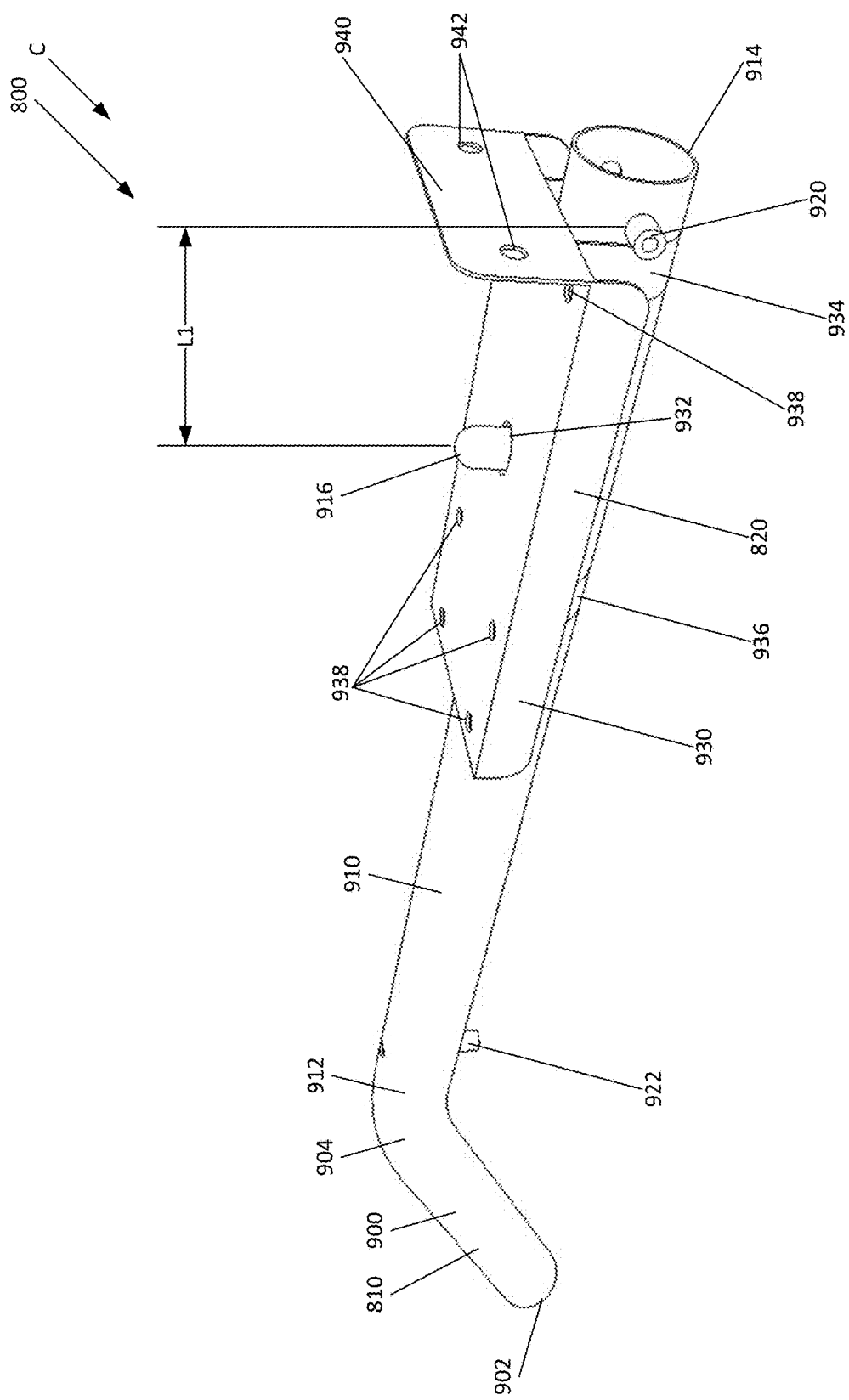
FIG. 9C illustrates a perspective view of the handle assembly shown in FIG. 9A, the handle oriented in the deployed position.

FIGS. 9A, 9B, and 9C depict the handle assembly 800, which is shown in isolation for illustrative purposes only. As previously explained, the handle assembly 800 includes a handle portion 810 and a housing portion 820. The handle portion 810 may be a hollow cylinder that includes a first segment 900 and a second segment 910. The first segment 900 includes a first end 902 and a second end 904, and the second segment 910 includes a first end 912 and a second end 914. The first end 912 of the second segment 910 is coupled to the second end 904 of the first segment 900, where the first segment 900 is angled with respect to the second segment 910. Disposed on the second segment 910 is a first snap button 916 and a second snap button 918. As illustrated, the first and second snap buttons 916, 918 extend through the sidewall of the second segment 910 of the handle portion 810 of the handle assembly 800. The first snap button 916 is disposed along the second segment 910 at a location that is closer to the second end 914 than the first end 912. The second snap button 918 is disposed along the second segment 910 at a location that is closer to the first end 912 than the second end 914. Furthermore, the first and second snap buttons 916, 918 are disposed at locations that are circumferentially offset approximately 90 degrees (e.g., the snap buttons 916, 918 are radially offset along the circumference of the second element 910 of the handle portion 810 by approximately 90 degrees).

As further illustrated in FIGS. 9A, 9B, and 9C, the second segment 910 further includes a first protrusion 920 and a second protrusion 922. The first protrusion 920 is disposed proximate to the second end 914 of the second segment 910 of the handle portion 810, while the second protrusion 922 is disposed proximate to the first end 912 of the second segment 910 of the handle portion 810. As illustrated, the first protrusion 920 is located closer to the second end 914 of the second segment 910 than the first snap button 916, while the second protrusion 922 is located closer to the first end 912 of the second segment 910 than the second snap button 918. The first protrusion 920 is offset longitudinally along the second segment 910 of the handle portion 810 a first length L1 from the first snap button 916, while the second protrusion 922 is offset longitudinally along the second segment 910 of the of the handle portion 810 a second length L2 from the second snap button 918. In the embodiment illustrated, the first length L1 and the second length L2 may be substantially equal to one another. Furthermore, the first protrusion 920 is disposed at a location that is circumferentially offset approximately 90 degrees from the first snap button 916 (e.g., the first protrusion 920 is radially offset along the circumference of the second element 910 of the handle portion 810 by approximately 90 degrees from the first snap button 916). Similarly, the second protrusion 922 is disposed at a location that is circumferentially offset approximately 90 degrees from the second snap button 918 (e.g., the second protrusion 922 is radially offset along the circumference of the second element 910 of the handle portion 810 by approximately 90 degrees from the second snap button 918).

The housing portion 820 of the handle assembly 800 includes a first or substantially horizontal plate 930 and a second or substantially vertical plate 940. The first plate 930 of the housing portion 820 includes a substantially central opening 932 that is sized and shaped to receive one of either the first snap button 916 or the second snap button 918 depending on the position in which the handle portion 810 is configured. As best illustrated in FIGS. 9B and 9C, coupled to the bottom of the first plate 930 is a first bracket 934 and a second bracket 936. The first and second brackets 934, 936 are semi-circular in shape and configured to moveably receive the handle portion 810 such that the handle portion 810 can at least partially slide through the brackets 934, 936 and rotate within the brackets 934, 936. Thus, the brackets 934, 936 support and position the second segment 910 of the handle portion 810 against the bottom of the first plate 930. The first bracket 934 is disposed proximate to the rear end of the first plate 930, while the second bracket 936 is disposed proximate to the front end of the first plate 930.

The first plate 930 includes a plurality of apertures 938 (e.g., six apertures 938), where the four most rearward apertures 938 (i.e., the four apertures 938 closest to the second plate 940) are configured to receive fasteners (e.g., screws, bolts, rivets, etc.) that enable the brackets 934, 936 to be coupled to the bottom side of the first plate 930. The two most forward apertures 938 are configured to receive fasteners (e.g., screws, bolts, rivets, etc.) to couple the front end of the first plate 930 of the housing portion 820 to the crossbar 132C of the forward platform member 130.

The second plate 940 is coupled to the first plate 930 proximate to the rear end of the first plate 930, where the second plate 940 extends upwardly from the rear end of the first plate 930. Thus, the second plate 940 is offset approximately 90 degrees from the first plate 930 (e.g., the second plate 940 forms a 90 degree right angle with the first plate 930). As further illustrated, the second plate 940 includes a pair of apertures 942, which are configured to receive fasteners (e.g., screws, bolts, rivets, etc.) that enable the second plate 940 to be coupled to the cross brace 830 of the forward platform member 130.

As illustrated in FIGS. 9A and 9B, the handle portion 810 of the handle assembly 800 is oriented in the stowed configuration D. When in the stowed configuration D, the second end 914 of the second segment 910 of the handle portion 810 is spaced from the rear end of the housing portion 820, while the second end 904 of the first segment 900 of the handle portion 810 is disposed proximate to the front end of the housing portion 820. Moreover, in the stowed configuration D, the handle portion 810 is rotated such that the angled first segment 900 of the handle portion 810 is configured to extend toward the side of the housing portion 820 of the handle assembly 800. When in the stowed configuration D, the second snap button 918 extends through the opening 932 of the first plate 930 of the housing portion 820 to secure the handle portion 810 in the stowed configuration D. In addition, the second protrusion 922 abuts the front end of the second bracket 936.

As illustrated in FIG. 9C, the handle portion 810 of the handle assembly 800 is oriented in the deployed configuration C. When in the deployed configuration C, the second end 914 of the second segment 910 of the handle portion 810 is disposed proximate to the rear end of the housing portion 820, while the second end 904 of the first segment 900 of the handle portion 810 is spaced from the front end of the housing portion 820. Moreover, in the deployed configuration C, the handle portion 810 is rotated such that the angled first segment 900 of the handle portion 810 is configured to extend, to an extent, perpendicularly from the plane in which apertures 938 of the housing portion 820 of the handle assembly 800 are located. When in the deployed configuration C, the first snap button 916 extends through the opening 932 of the first plate 930 of the housing portion 820 to secure the handle portion 810 in the deployed configuration C, while the first protrusion 920 abuts the rear end of the first bracket 934.

To reconfigure the handle portion 810 from the deployed configuration C to the stowed configuration D, a user would grasp the first segment 900 of the handle portion 810 and then depress the first snap button 916 until the first snap button 916 is no longer extending through the opening 932 in the first plate 930 of the housing portion 820. Once the first snap button 916 no longer extends through the opening 932, the user may pushes the first segment 900 of the handle portion 810 towards the housing portion 820 until the first snap button 916 is disposed rearward of the first bracket 934, and until the second snap button 918 comes into contact with the front edge of the second bracket 936. The user then rotates the handle portion 810 approximately 90 degrees until the second snap button 918 comes into contact with the bottom of the first plate 930 such that the bottom of the first plate 930 depresses the second snap button 918. At this point, the first segment 900 of the handle portion 810, which is angled with respect to the second segment 910 of the handle portion 810, extends from the side of the housing portion 820 rather than downward. The user may then continue to push the handle portion 810 rearward until the second protrusion 922 abuts the front edge of the second bracket 936. The longitudinal length L2 between the second snap button 918 and the second protrusion 922 is equivalent to the longitudinal length between the opening 932 of the first plate 930 and the front edge of the second bracket 936. Thus, the abutment of the second protrusion 922 with the second bracket 936 enables the user to quickly and efficiently align second snap button 918 with the opening 932 of the first plate 930. Once the second protrusion 922 abuts the front edge of the second bracket 936, the user may rotate the handle portion 810 until the second snap button 918 rotates into alignment with the opening 932 of the first plate 930. When the second snap button 918 extends through the opening 932 of the first plate 930, the handle portion 810 is secured in the stowed configuration D illustrated in FIGS. 8B, 9A, and 9B.

The method for reconfiguring the handle portion 810 from the stowed configuration D to the deployed configuration C is substantially similar to the method for reconfiguring the handle portion 810 from the deployed configuration C to the stowed configuration D. To reconfigure the handle portion 810 from the stowed configuration D to the deployed configuration C, a user would grasp the first segment 900 of the handle portion 810 and then depress the second snap button 918 until the second snap button 918 is no longer extending through the opening 932 in the first plate 930 of the housing portion 820. Once the second snap button 918 no longer extends through the opening 932, the user may pull the first segment 900 of the handle portion 810 away from the front of the housing portion 820 until the second snap button 918 is disposed forward of the second bracket 936, and until the first snap button 916 comes into contact with the rear edge of the first bracket 934. The user then rotates the handle portion 810 approximately 90 degrees until the first snap button 916 comes into contact with the bottom of the first plate 930 such that the bottom of the first plate 930 depresses the first snap button 916. At this point, the first segment 900 of the handle portion 810, which is angled with respect to the second segment 910 of the handle portion 810, may be angled downward with respect to the housing portion 820. The user may then continue to pull the handle portion 810 forward until the first protrusion 920 abuts the rear edge of the first bracket 934. The longitudinal length L1 between the first snap button 916 and the first protrusion 920 is equivalent to the longitudinal length between the opening 932 of the first plate 930 and the rear edge of the first bracket 934. Thus, the abutment of the first protrusion 920 with the first bracket 934 enables the user to quickly and efficiently align first snap button 916 with the opening 932 of the first plate 930. Once the first protrusion 920 abuts the rear edge of the first bracket 934, the user may rotate the handle portion 810 until the first snap button 916 rotates into alignment with the opening 932 of the first plate 930. When the first snap button 916 extends through the opening 932 of the first plate 930, the handle portion 810 is secured in the deployed configuration C illustrated in FIGS. 8A and 9C.

While the invention has been described in detail and with reference to specific embodiments thereof, it will be apparent to one skilled in the art that various changes and modifications can be made therein without departing from the spirit and scope thereof. It is to be understood that terms of reference such as "top", "bottom", "front", "rear", "side", "height", "length", "width", "upper", "lower", "interior", "exterior", and the like as may be used herein, merely describe points of reference and do not limit the present invention to any particular orientation or configuration. Similarly, various words and phrases, such as "perpendicular", and "parallel", are used to describe the location of the invention's components in space, direction, orientation or in relation to other components. The word "slot" is used to describe a slot, gap or similar opening, channel or passage. The word "loop" is used to describe a loop, sleeve or similar means to attach material to another object. The word "width" is used to describe the width of a of objects that do not have a circumference and the diameter of objects that may have a circumference. Where applicable such, words and phrases also incorporate adjectives such as "approximately" to encompass the full range of embodiments possible. Thus, it is intended that the present invention covers the modifications and variations of this invention provided they come within the scope of the appended claims and their equivalents.

What is claimed is:

1. A collapsible support structure comprising:
   a frame member;
   a retaining mechanism disposed on the frame member, the retaining mechanism comprising:
      a first spacer element coupled to the frame member at a first location,
      a second spacer element coupled to the frame member at a second location, the second location being spaced from the first location, and
      an elongate bar including a first end and a second end, the first end of the elongate bar being coupled to the first spacer element and the second end of the elongate bar being coupled to the second spacer element, wherein the elongate bar, the first spacer element, the second spacer element, and the frame member collectively define a slot; and
   a support member removably coupled to the frame member via the retaining mechanism, wherein an end of the support member is disposed through the slot of the retaining mechanism when coupled to the frame member, and the end of the support member includes a loop configured to receive a retention member.

2. The collapsible support structure of claim 1, wherein the support member is constructed from a flexible and deformable material.

3. The collapsible support structure of claim 1, wherein the slot has a width spanning between the frame member and the elongate bar, and the retention member has a diameter, the diameter of the retention member being larger than the width of the slot.

4. The collapsible support structure of claim 1, wherein the retention member is configured to prevent the end of the support member from sliding through the slot when the retention member is received by the loop of the end of the support member.

5. The collapsible support structure of claim 1, wherein the frame member is a first frame member, the retaining mechanism is a first retaining mechanism, the elongate bar is a first retaining bar, the slot is a first slot, the end of the support member is a first end, and the loop is a first loop, the collapsible support structure further comprising:
 a second frame member laterally spaced from the first frame member;
 a second retaining mechanism disposed on the second frame member, the second retaining mechanism comprising:
  a third spacer element coupled to the second frame member at a third location,
  a fourth spacer element coupled to the second frame member at a fourth location, the third location being spaced from the fourth location, and
  a second elongate bar including a third end and a fourth end, the third end of the elongate bar being coupled to the third spacer element and the fourth end of the elongate bar being coupled to the fourth spacer element, wherein the second elongate bar, the third spacer element, the fourth spacer element, and the second frame member collectively define a second slot, and
 wherein the support member is removably coupled to the second frame member via the second retaining mechanism, a second end of the support member being disposed through the second slot of the second retaining mechanism when coupled to the second frame member, and the second end of the support member includes a second loop configured to receive a retention member.

6. The collapsible support structure of claim 5, wherein the support member is a planar member defining a support surface operable to support an object when coupled to the first frame member and the second frame member.

7. A method of removably coupling a support member to a frame of a collapsible support structure comprising:
 inserting a loop disposed on an end of the support member through a slot of a retaining mechanism mounted to an elongated arm of the frame, the loop of the support member being inserted through the slot in a direction from a first side of the slot to a second side of the slot until the loop is disposed outside of the slot proximate to the second side of the slot, the loop being in a collapsed position when inserted through the slot;
 opening the loop disposed on the end of the support member from the collapsed position to an expanded configuration; and
 inserting a retention member into the loop of the end of the support member when the loop is in the expanded configuration.

8. The method of claim 7, wherein a first width of the retention member is greater than a second width of the slot of the retaining mechanism.

9. The method of claim 7, wherein the retaining mechanism is mounted onto a bottom surface of the elongate arm of the frame.

10. The method of claim 9, further comprising:
 extending the end of the support member beyond a top surface of the elongate arm of the frame; and
 wrapping the end of the support member at least partially around the elongate arm of the frame prior to inserting the loop disposed on the end of the elongate arm through the slot of the retaining mechanism.

11. The method of claim 7, wherein the end of the support member is a first end, the loop is a first loop, the slot is a first slot, the retaining mechanism is a first retaining mechanism, the elongate arm is a first elongate arm, the retention member is a first retention member, and the direction is a first direction, the method further comprising:
 inserting a second loop disposed on a second end of the support member through a second slot of a second retaining mechanism mounted on a second elongate arm of the frame, the second loop of the support member being inserted through the second slot in a second direction from a third side of the second slot to a fourth side of the second slot until the second loop is disposed outside of the second slot proximate to the fourth side of the second slot, the second loop being in a collapsed position when inserted through the second slot, and the second elongate arm being spaced laterally from the first elongate arm;
 opening second loop disposed on the second end of the support member from the collapsed position to an expanded configuration; and
 inserting a second retention member into the loop of the second end of the support member when the second loop is in the expanded configuration.

12. The method of claim 7, wherein the support member is constructed from a flexible and deformable material.

13. A collapsible support structure comprising:
 a frame including a first arm and a second arm laterally spaced from the first arm;
 a first retaining bar disposed on the first arm of the frame, the first retaining bar and the first arm collectively defining a first slot,
 a second retaining bar disposed on a second arm of the frame, the second retaining bar and the second arm collectively defining a second slot; and
 a support member removably coupled to the frame, wherein a first end of the support member is disposed through the first slot and a second end is disposed through the second slot when coupled to the frame, the first end of the support member including a first loop and the second end of the support member including a second loop, the support member defining a support surface configured to support an object between the first arm and the second arm when coupled to the frame.

14. The collapsible support structure of claim 13, wherein the support member is constructed from a flexible and deformable material.

15. The collapsible support structure of claim 13, wherein the first loop is configured to receive a first retention member and the second loop is configured to receive a second retention member.

16. The collapsible support structure of claim 15, wherein the first slot has a first width, the second slot has a second width, the first retention member has a third width or diameter, and the second retention member has a fourth width, the fourth width and the third width being greater than the second width and the first width.

17. The collapsible support structure of claim 15, where the first slot has a first length, the second slot has a second length, the first retention member has a third length, and the second retention member has a fourth length, the fourth length and the third length being greater than the second length and the first length.

18. The collapsible support structure of claim 15, wherein the first retention member is configured to prevent the first end of the support member from sliding through the first slot when the first retention member is received by the first loop, and the second elongate retention member is configured to prevent the second end of the support member from sliding through the second slot when the second retention member is received by the second loop.

19. The collapsible support structure of claim 18, wherein the collapsible support structure is a foldable chair.

20. The collapsible support structure of claim 18, wherein the collapsible support structure is a foldable cart.

* * * * *